United States Patent
Iwasaki et al.

(10) Patent No.: US 7,095,040 B2
(45) Date of Patent: *Aug. 22, 2006

(54) ELECTRON-EMITTING DEVICE AND METHOD OF MANUFACTURING THE SAME AND DISPLAY APPARATUS USING THE SAME

(75) Inventors: Shingo Iwasaki, Tsurugashima (JP);
Takashi Yamada, Tsurugashima (JP);
Takuya Hata, Tsurugashima (JP);
Takashi Chuman, Tsurugashima (JP);
Nobuyasu Negishi, Tsurugashima (JP);
Kazuto Sakemura, Tsurugashima (JP);
Atsushi Yoshizawa, Tsurugashima (JP);
Hideo Satoh, Tsurugashima (JP);
Takamasa Yoshikawa, Tsurugashima (JP); Kiyohide Ogasawara, Tsurugashima (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/753,722

(22) Filed: Jan. 4, 2001

(65) Prior Publication Data
US 2001/0017369 A1    Aug. 30, 2001

(30) Foreign Application Priority Data
Jan. 13, 2000   (JP) ............................. 2000-004830

(51) Int. Cl.
*H01L 29/43* (2006.01)

(52) U.S. Cl. .......................... 257/10; 313/310; 313/311
(58) Field of Classification Search .................. 257/10; 313/309, 310, 336, 351, 495, 496, 311
See application file for complete search history.

(56) References Cited

U.S. PATENT DOCUMENTS 3,184,659 A     5/1965   Cohen
3,447,043 A     5/1969   Wallace
3,535,598 A  * 10/1970   Feist .......................... 317/234

(Continued)

FOREIGN PATENT DOCUMENTS

EP         0 863 533    *  9/1998

(Continued)

OTHER PUBLICATIONS

Webster's unabriged dictionary of the English language, 1989 ed., p. 303.*

*Primary Examiner*—Jerome Jackson
(74) *Attorney, Agent, or Firm*—Drinker Biddle & Reath LLP

(57) ABSTRACT

An electron-emitting device includes an electron source layer made of a metal, a metal alloy or a semiconductor, an insulating layer formed on the electron source layer and a metal thin film electrode formed on the insulating layer. Electrons are emitted upon application of an electric field between the electron source layer and the metal thin film electrode. The insulating layer has at least one island region which constitutes an electron-emitting section in which the film thickness of the insulating layer is gradually reduced. The electron-emitting device further includes a carbon region made of carbon or a carbon compound on at least one of a top, bottom and inside of the island region.

35 Claims, 19 Drawing Sheets

U.S. PATENT DOCUMENTS

| | | | |
|---|---|---|---|
| 5,202,605 A * | 4/1993 | Kaneko et al. | 313/444 |
| 5,569,974 A * | 10/1996 | Morikawa et al. | 313/310 |
| 5,702,281 A * | 12/1997 | Huang et al. | 445/50 |
| 5,814,924 A * | 9/1998 | Komatsu | 313/309 |
| 6,166,487 A * | 12/2000 | Negishi et al. | 313/495 |
| 6,285,123 B1 * | 9/2001 | Yamada et al. | 313/495 |
| 2003/0048745 A1 * | 3/2003 | Yoshikawa et al. | 369/292 |

FOREIGN PATENT DOCUMENTS

| | | | |
|---|---|---|---|
| JP | 02-172127 | | 7/1990 |
| JP | 03-046729 | | 2/1991 |
| JP | 3-225721 | * | 10/1991 |
| JP | 06-068785 | | 3/1994 |
| JP | 7-65710 | | 3/1995 |
| JP | 08-236010 | | 9/1996 |
| JP | 52-004163 | | 1/1997 |
| JP | 10-177838 | | 6/1998 |
| JP | 10-312738 | * | 11/1998 |
| JP | 10-312741 | * | 11/1998 |
| JP | 11-67065 | * | 3/1999 |
| JP | 11-167860 | | 6/1999 |
| JP | 2000-156147 | | 6/2000 |

* cited by examiner

ELECTRON-EMITTING DEVICE AND METHOD OF MANUFACTURING THE SAME AND DISPLAY APPARATUS USING THE SAME

BACKGROUND OF THE INVENTION

The present invention relates to an electron-emitting device and a display apparatus using the same, especially to a flat panel display apparatus in which a plurality of the electron-emitting devices are arranged in an image display array, i.e. in a matrix arrangement.

As flat panel display apparatus, a field emission display (FED) comprising field electron-emitting devices is known. One of the known flat light-emitting displays uses a cold-cathode type electron-emitting source array in which heating of cathodes is not required. For instance, according to the principle of the light emission in an FED using a Spindt-type cold cathode, the light emission is achieved by drawing electrons out to a vacuum by a gate electrode disposed apart from a cathode, and having those electrons collided with a phosphor applied on a transparent anode in the same manner as a CRT (cathode ray tube) although there is a difference as the FED employs the cold cathode.

However, this field emission source has a problem of low manufacturing production since it requires a large number of complicated manufacturing processes for the minute Spindt-type cold cathodes.

There also are electron-emitting devices having metal-insulator-metal (MIM) structures as surface electron sources. One of such MIM-type electron-emitting devices has a structure comprising an Al layer, an $Al_2O_3$ insulating layer having a thickness of about 10 nm, and an Au layer having a thickness of about 10 nm that are sequentially formed on a substrate as a cathode. When this structure is placed under a counter electrode within a vacuum, and a voltage is applied between the bottom Al layer and the top Au layer in conjunction with the application of an accelerating voltage to the counter electrode, then a part of the electrons from the top Au layer are emitted and they are accelerated and come in contact with the counter electrode. In this light-emitting device also, the light emission is achieved due to the electrons impinging on the phosphor applied on the counter electrode.

However, the amount of the electron emission is not quite sufficient even with the use of such MIM-type electron-emitting devices. To improve this emission, it has been believed that it is necessary to reduce the film thickness of the prior art $Al_2O_3$ insulating layer by several nanometers, and to give further uniformity to the film quality of the ultra-thin $Al_2O_3$ insulating layer and the interface between the $Al_2O_3$ insulating layer and the top Au layer.

There have been attempts to improve the electron emission characteristics such as an invention described in, for example, JP-A-7-65710 employing an anodization method in which the forming current is controlled to further reduce the film thickness and improve the uniformity of the insulating layer. However, even with such an MIM-type electron-emitting device manufactured according to this method, it has been only possible to achieve an emission current of, as much as about $1 \times 10^{-5} A/cm^2$ and an electron emission efficiency on the order of about 0.1%.

In an MIM-type electron-emitting device having an insulating layer as thick as several tens of nanometers to several micrometers, a uniform forming state cannot be obtained two-dimensionally, and there is a problem in that its electron emission characteristic is unstable. In general, an MIM device or an MIS-type electron-emitting device having an insulating layer as thick as several tens of nanometers to several micrometers is not yet capable, as manufactured, of providing electron emission. A process called "forming" is required, in which a voltage is applied between it and the ohmic electrode so as the metal thin film electrode would become a positive pole. The forming process differs from so-called electrical breakdown, and it has not yet been clearly explained although there have been various hypotheses such as those attempting to explain it as; the diffusion of electrode material into the insulating layer; the crystallization within the insulating layer; the growth of electroconductive paths called filaments; the stoichiometric deviation of the insulator composition and so forth. The controllability of this forming process is extremely low, and it is difficult to manufacture the devices with high stability and good reproducibility. Moreover, there is a fact that the growing locations of such forming sites are contingent across the electrode surface, so that originating points of electron emission (electron emission source) cannot be specified. In other words, the originating points of the electron emission cannot be formed homogeneously across the surface of the device, resulting in poor uniformity of the electron emission pattern.

Moreover, as another electron-emitting device, there is a surface-conduction electron-emitting device wherein cracks constituting electron-emitting sections are provided within an electroconductive thin film through electrification after laying the electroconductive thin film between counter electrodes provided on insulating substrates. These cracks are the sections of the electroconductive thin film that have locally been destroyed, transformed or deformed, so that there are problems in that, it has unevenness and poor geometric reproducibility, the shapes of the electron emitting portions are limited to linear shapes and so forth.

SUMMARY OF THE INVENTION

The object of the invention, which was invented in consideration of the above background, is to provide an electron-emitting device capable of providing stable electron emission with a low voltage, and a display apparatus such as a flat panel display apparatus using such electron-emitting devices.

An electron-emitting device of the invention comprises an electron source layer made of a metal, a metal compound or a semiconductor, an insulating layer formed on the electron source layer and a metal thin film electrode formed on the insulating layer, and emits electrons when an electric field is applied between the electron source layer and the metal thin film electrode, and the device is characterized in that the insulating layer has at least one island region constituting an electron-emitting section in which the film thickness of the insulating layer is gradually reduced, and a carbon region made of carbon or a carbon compound is provided either on the top or bottom, or inside of the island region.

In the electron-emitting device according to one aspect of the invention, said metal thin film electrode and said carbon region are deposited by one of a physical deposition method and a chemical deposition method.

In the electron-emitting device according to one aspect of the invention, said carbon region is a thin film deposited on one of said island region and said metal thin film electrode.

In the electron-emitting device according to one aspect of the invention, said carbon region is a thin film deposited on said island region while a voltage is being applied between said electron source layer and said metal thin film electrode.

In the electron-emitting device according to one aspect of the invention, said applied voltage is supplied intermittently according to a voltage application period in which the voltage rises and falls.

In the electron-emitting device according to one aspect of the invention, said carbon region is distributed within said metal thin film electrode.

In the electron-emitting device according to one aspect of the invention, said carbon region is a thin film deposited under said metal thin film electrode.

In the electron-emitting device according to one aspect of the invention, said carbon region is a thin film deposited under said insulating layer.

In the electron-emitting device according to one aspect of the invention, the thickness of said metal thin film is gradually reduced in conjunction with said insulating layer.

In the electron-emitting device according to one aspect of the invention, the thickness of said carbon region is gradually reduced in conjunction with said insulating layer.

In the electron-emitting device according to one aspect of the invention, said insulating layer is made of a dielectric material and has a thickness of at least 50 nm in areas other than said island region.

In the electron-emitting device according to one aspect of the invention, said metal thin film electrode terminates on said insulating layer within said island region.

In the electron-emitting device according to one aspect of the invention, said insulating layer terminates on said electron source layer within said island region.

In the electron-emitting device according to one aspect of the invention, said island region is a recess on a flat surface of said metal thin film electrode and said insulating layer.

In the electron-emitting device according to one aspect of the invention, the device further comprises a fine particle within said island region.

In the electron-emitting device according to one aspect of the invention, the device further comprises, within said island region, a reverse-tapered block projecting in a direction normal to said substrate and at a top portion thereof, includes an overhang projecting in a direction parallel to said substrate.

A method for manufacturing an electron-emitting device according to the invention comprisies:
 an electron source layer formation process for forming an electron source layer made of one of a metal, a metal alloy and a semiconductor on a substrate;
 a mask formation process for forming masks on said electron source layer, each of said masks providing a shade around an area in which the masks contact with said electron source layer;
 an insulating layer formation process for depositing an insulating layer over said electron source layer and said masks so as to provide said insulating layer as a thin film of an insulator, said insulating layer having island regions in which film thickness of said insulating layer is gradually reduced in the proximity of the contact areas of said masks; and
 a metal thin film electrode formation process for forming a metal thin film electrode over said insulating layer, thereby constituting said island regions as electron-emitting sections;

said manufacturing method further comprises a process for providing a carbon region made of one of carbon and a carbon compound proximal to said island regions.

In the method according to one aspect of the invention, the method further comprises a mask elimination process for eliminating said masks immediately after said metal thin film electrode formation process, and said process for providing said carbon region is performed immediately after said mask elimination process, thereby forming said carbon region as a thin film deposited over said metal thin film electrode.

In the method according to one aspect of the invention, said process for providing said carbon region is performed by depositing said carbon region as a thin film while applying a voltage between said electron source layer and said metal thin film electrode.

In the method according to one aspect of the invention, said applied voltage is supplied intermittently according to a voltage application period in which the voltage rises and falls.

In the method according to one aspect of the invention, the method further comprises a mask elimination process for eliminating said masks immediately after said insulating layer formation process, and said process for providing said carbon region is performed during said metal thin film electrode formation process, thereby having said carbon region distributed within said metal thin film electrode.

In the method according to one aspect of the invention, said process for providing said carbon region is performed immediately after said metal thin film electrode formation process, thereby forming said carbon region as a thin film deposited over said metal thin film electrode.

In the method according to one aspect of the invention, said process for providing said carbon region is performed immediately before said metal thin film electrode formation process, thereby forming said carbon region as a thin film deposited under said metal thin film electrode.

In the method according to one aspect of the invention, said process for providing said carbon region is performed immediately before said insulating layer formation process, thereby forming said carbon region as a thin film deposited under said insulating layer.

In the method according to one aspect of the invention, the method further comprises a mask elimination process for eliminating said masks immediately after said metal thin film electrode formation process, and said process for providing said carbon region is performed immediately after said mask elimination process, thereby forming said carbon region as a thin film deposited over said metal thin film electrode.

In the method according to one aspect of the invention, a voltage is applied between said electron source layer and said metal thin film electrode immediately after at least one of said process for providing said carbon region, said metal thin film electrode formation process, and said mask elimination process.

In the method according to one aspect of the invention, said masks are fine particles, and said mask formation process comprises a step of spraying said fine particles onto said electron source layer.

In the method according to one aspect of the invention, each of said masks is an electrically insulating reverse-tapered block which projects outwardly in a direction normal to said substrate and has an overhang in a top portion thereof, projecting in a direction parallel to said substrate, and said mask formation process includes steps of:
 forming a reverse-tapered block material layer on said substrate;
 forming thereon a resist mask which allows at least a part of said electron source layer to be exposed through a photolithographic method; and etching out said reverse-tapered block having said overhang by one of a dry etching method and a wet etching method.

In the method according to one aspect of the invention, said insulating layer, said metal thin film electrode and said carbon region are deposited by a physical deposition method or a chemical deposition method.

A display apparatus according to the present invention comprises;

a first substrate and a second substrate facing each other with a vacuum space therebetween;

a plurality of electron-emitting devices provided on said first substrate;

a collector electrode provided on an interior surface of said second substrate; and a phosphor layer formed on said collector electrode; wherein each of said electron-emitting devices comprises an electron source layer made of one of a metal, a metal alloy and a semiconductor formed on an ohmic electrode, an insulating layer formed on said electron source layer and a metal thin film electrode formed on said insulating layer, said insulating layer having at least one island region constituting an electron-emitting section in which the film thickness of said insulating layer is gradually reduced, and a carbon region made of one of carbon and a carbon compound is provided on at least one of a top, bottom and inside of said island region.

In the display apparatus according to one aspect of the invention, said insulating layer, said metal thin film electrode and said carbon region are deposited by one of a physical deposition method and a chemical deposition method.

In the display apparatus according to one aspect of the invention, said carbon region is a thin film deposited on one of said island region and said metal thin film electrode.

In the display apparatus according to one aspect of the invention, said carbon region is a thin film deposited on said island region while a voltage is being applied between said electron source layer and said metal thin film electrode.

In the display apparatus according to one aspect of the invention, said applied voltage is supplied intermittently according to a voltage application period in which the voltage rises and falls.

In the display apparatus according to one aspect of the invention, said carbon region is distributed within said metal thin film electrode.

In the display apparatus according to one aspect of the invention, said carbon region is a thin film deposited under said metal thin film electrode.

In the display apparatus according to one aspect of the invention, said carbon region is a thin film deposited under said insulating layer.

In the display apparatus according to one aspect of the invention, the thickness of said metal thin film electrode is gradually reduced in conjunction with said insulating layer.

In the display apparatus according to one aspect of the invention, the thickness of said carbon region is gradually reduced in conduction with said insulating layer.

In the display apparatus according to one aspect of the invention, said insulating layer is made of a dielectric material and has a film thickness of at least 50 nm in areas other than said island region.

In the display apparatus according to one aspect of the invention, said metal thin film electrode terminates on said insulating layer within said island region.

In the display apparatus according to one aspect of the invention, said insulating layer terminates on said electron source layer within said island region.

In the display apparatus according to one aspect of the invention, said island region is a recess on a flat surface of said metal thin film electrode and said insulating layer.

In the display apparatus according to one aspect of the invention, the display apparatus further comprises a fine particle within said island region.

In the display apparatus according to one aspect of the invention, the display apparatus further comprises, within said island region, a reverse-tapered block which projects outwardly in a direction normal to said substrate and has an overhang in a top portion thereof, projecting in a direction parallel to said substrate.

In the display apparatus according to one aspect of the invention, bus lines are formed over a plurality of said metal thin film electrodes, and said ohmic electrodes and said bus lines are electrodes, each having a shape of a strip, and arranged orthogonal to each other.

According to the present invention having the above any configuration, in the direction to which the interface between the insulating layer and the metal thin film layer extends, a carbon region made of carbon or a carbon compound is provided either on the top or bottom, or inside of each of a plurality of islands in which the film thicknesses of the insulating layer and the metal thin film electrode are gradually reduced respectively, so that an electron-emitting device in which the amount of electrons emitted from those island regions are increased may be obtained.

Moreover, according to the electron-emitting device of the invention, since the insulating layer has a large film thickness in the portion other than the island regions, through-holes are unlikely to occur, which in turn, would improve the manufacturing yield. Furthermore, the electron-emitting device of the invention may be implemented as a high-speed device such as a light-emitting source of a pixel valve, an electron-emitting source of an electron microscope, and a vacuum microelectronic element etc., and it is also operable as a surface-type or dot-type electron-emitting diode, a light-emitting diode or a laser diode emitting electromagnetic waves of millimeter-scale or submillimeter-scale, as well as a high-speed switching element.

DETAILED DESCRIPTION OF THE INVENTION

Now, embodiments of the invention will be explained with reference to figures.

{Electron-Emitting Device}

Figure 1:
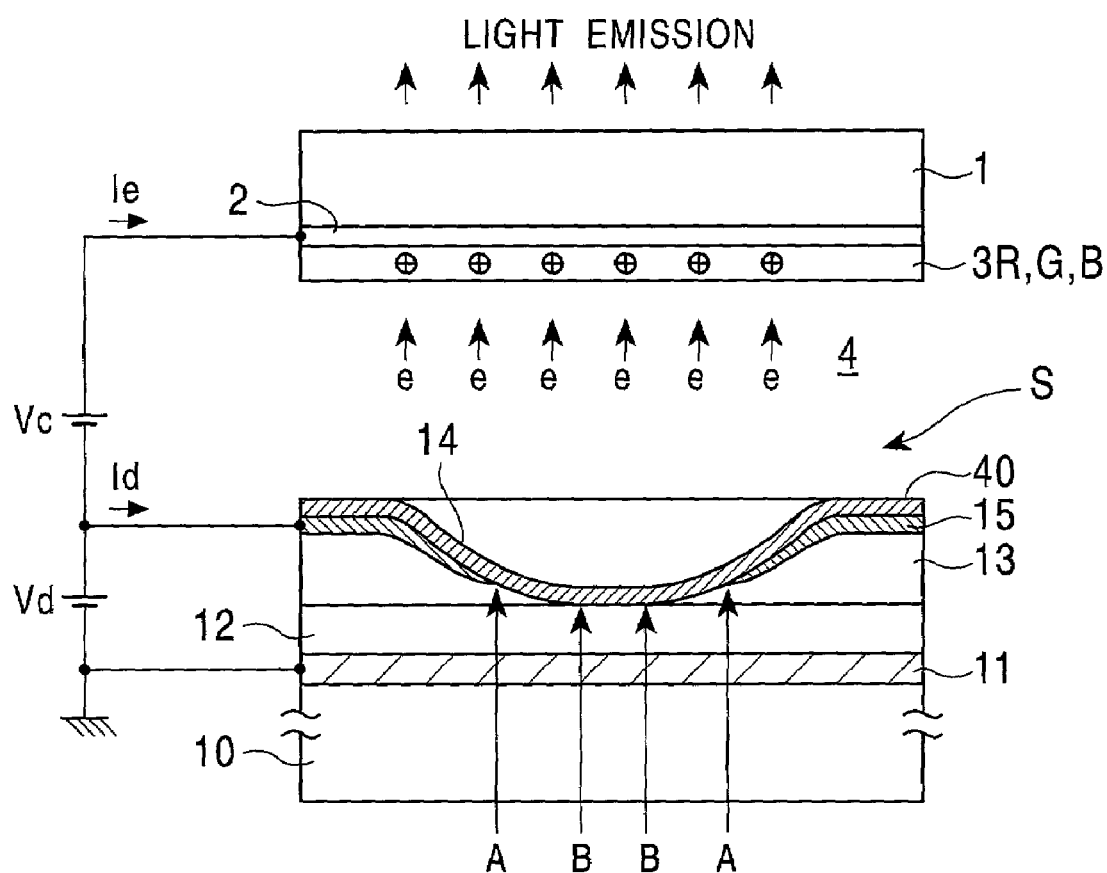
FIG. 1 is a schematic cross-sectional view of an electron-emitting device of the invention.

As shown in FIG. 1, an electron-emitting device S of the invention in one embodiment comprises an ohmic electrode 11 made of aluminum (Al), tungsten (W), titanium nitride (TiN), cupper (Cu) or chrome (Cr) etc. formed over i.e. a glass substrate 10, an electron source layer 12 made of a metal, a metal compound or silicon (Si) etc. formed thereon, an insulating layer 13 made of $SiO_x$ (x=0.1–2.0) etc. formed thereon, a metal thin film electrode 15 made of, i.e. white gold (Pt) or gold (Au) etc. formed thereon, and a carbon region made of carbon or a carbon compound formed at least over a recessed portion 14. As for the material of the carbon region 40, forms of carbon such as amorphous carbon, graphite, carbyne, fullerene ($C_{2n}$), diamond-like carbon, carbon nano-tube, and diamond etc., or carbon compounds such as ZrC, SiC, WC, and MoC etc. are effective.

The insulating layer 13 is made of a dielectric material, and its thickness in the flat portion is 50 nm or greater which is extremely large. This layer is formed through a sputtering method with the use of Ar, Kr or Xe gas, or the combination thereof, or a mixed gas containing these rare gases as the main component with $O_2$ or $N_2$ mixed thereto, under a sputtering condition; gas pressure=0.1–100 mTorr, preferably 0.1–20 mTorr, and growth rate=0.1–1000 nm/min, preferably 0.5–100 nm/min.

In the insulating layer 13 and the metal thin film electrode 15, a recess 14, that is, an island region 14 in which the film thickness of both the films are gradually reduced toward the center, is formed. As shown in FIG. 1, the island region 14 is formed as a circular concave region in the flat surface of the metal thin film electrode 15, and on this island region 14, the carbon region is deposited. In the island region 14, the metal thin film electrode 15 is terminated on the insulating layer 13 at an edge position A. The insulating layer 13 is also terminated within the island region 14, on the electron source layer 12 at an edge position B. The carbon region 40 covers the metal thin film electrode 15, insulating layer 13 and electron source layer 12.

As for the material of the electron source layer 12 of the electron-emitting device, Si is especially effective, however, it is also possible to use amorphous silicon (a-Si), hydrogenated amorphous silicon (a-Si:H) in which the dangling bonds of a-Si are terminated with hydrogen (H), or a compound semiconductor such as hydrogenated amorphous silicon carbide (a-SiC:H) in which a part of Si is replaced with carbon (C) or hydrogenated amorphous silicon nitride (a-SiN:H) in which a part of Si is replaced with nitrogen (N), or silicon doped with boron, gallium, phosphorus, indium, arsenic, or antimony. Instead of using Si, a single semiconductor or a compound semiconductor of group IV, III-V, or II-VI such as germanium (Ge), Ge-Si, silicon carbide (SiC), gallium arsenide (GaAs), indium phosphide (InP), cadmium selenide or $CuInTe_2$ etc. may also be used for the electron source layer.

Metals such as Al, Au, Ag and Cu etc. are also effective for the material of the electron source layer, but it is also possible to use Sc, Ti, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Nd, Pm, Sm, Eu, Gd, Tb, Dy, Ho, Er Tm, Yb, Lu or the like.

As for the dielectric material of the insulating layer 13, although silicon oxide ($SiO_x$) (x represents an atomic ratio) is especially effective, it may be a metal oxide or a metal nitride such as $LiO_x$, $LiN_x$, $NaO_x$, $Ko_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $NbN_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ or the like.

It is also effective, for the dielectric material of the insulating film 13, to use a complex metal oxide such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $CS_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2o_4$, $Ag_2CrO_4$, $BaCrO_4$, $K_2MoO_4$, $Na_2MoO_4$, $NiMoO_4$, $BaWO_4$, $NaWO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $AlTiO_5$, $FeTiO_3$, $MgTiO_3$, $Na_2SiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ or the like, or a sulfide such as FeS, $Al_2S_3$, MgS or ZnS etc., a fluoride such as LiF, $MgF_2$ or $SmF_3$ etc., a chloride such as HgCl, $FeCl_2$ or $CrCl_3$ etc., a bromide such as AgBr, CuBr or $MnBr_2$ etc., an iodide such as $PbI_2$, CuI or $FeI_2$ etc., or a metal oxide nitride such as SiAlON or the like.

Furthermore, carbon such as diamond or fullerene ($C_{2n}$), or a metal carbide such as $Al_4C_3$, $B_4C$, $CaC_2$, $Cr_3C_2$, $MO_2C$, MoC, NbC, SiC, TaC, TiC, VC, $W_2C$, WC or ZrC etc. is also effective. Fullerene ($C_{2n}$) is a spherical-shell like molecule made up of carbon atoms only, ranging from $C_{32}$ through $C_{960}$, among which the most known is $C_{60}$. The "x" suffix on the above terms such as "$O_x$" or "$N_x$" represents an atomic ratio.

The thickness of the insulating layer in the flat portion other than the island regions is 50 nm or greater, preferably from 100 nm to 1000 nm.

As for the material of the metal thin film electrode 15 on the electron-emitting side, metals such as Pt, Au, W, Ru or Ir are effective, but Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Tl, Pb, La, Ce, Pr, Nd, Pm, Sm, Eu, Gd, Tb, Dy, Ho, Er, Tm, Yb or Lu etc. may also be use.

{Manufacturing Method of the Electron-Emitting Device}

As for the film formation method in manufacturing such electron-emitting devices, a physical or chemical method is used. The physical methods are known as physical vapor deposition (PVD) and include a vacuum deposition method, molecular beam epitaxy method, sputtering method, ionized vapor deposition method and laser abrasion method. The chemical methods are known as chemical vapor deposition (CVD) and include thermal CVD, plasma CVD and MOCVD (metal-organic chemical vapor deposition) etc. Among these methods, the sputtering method is especially effective.

Figure 2:
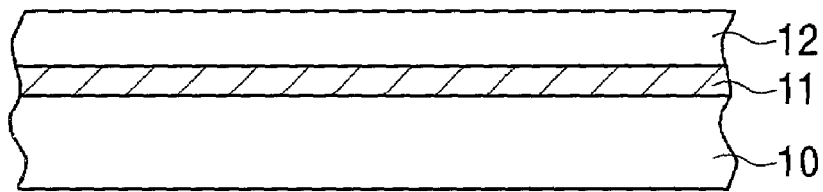
FIGS. 2 through 8 are expanded views of a portion of a device substrate during fabrication according to a manufacturing method of the electron-emitting device of the invention.
Figure 3:
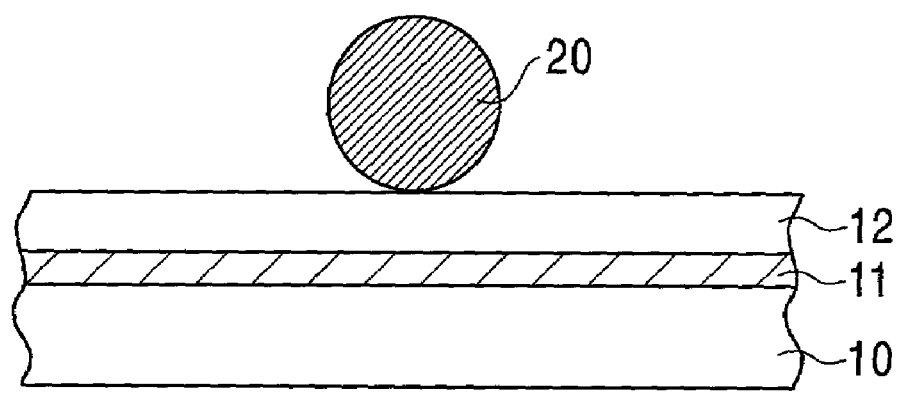

The island region 14 of FIG. 1 which is the concave portion covered by the carbon region 40, is formed in the following manner. First, as shown in FIG. 2, the electron source layer 12 is formed through sputtering on the substrate 10 having the ohmic electrode 11 formed thereon. Next, a plurality of spherical fine particles 20 are homogenously sprayed on the electron source layer as shown in FIG. 3. Although non-spherical shapes of the fine particles, which serve as masks, may also allow the electron emission to be obtained, spherical particles such as spacers for liquid crystal displays or ball mills having an isotropic geometry are preferred when considering their uniformity in grain boundaries and homogeneous distribution over the film, and lack of aggregation. In addition, a smaller grain size is preferred. The material of the fine particles may be an insulator, a semiconductor or a metal. When metallic fine particles are used, there is a possibility for the particles to cause short-circuits in the device, so that it is preferred to eliminate the particles after the formation of the metal thin film electrode 15.

Figure 4:
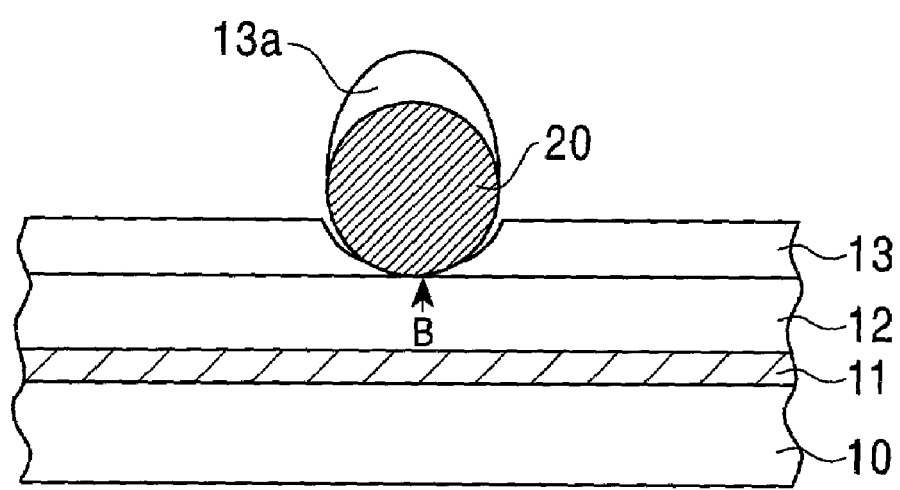

Thereafter, as shown in FIG. 4, an insulator 13, 13a is formed on the electron source layer 12 and on the fine particles 20 to form an insulating layer 13 made of a thin film of the insulator. At this point, the insulator is deposited also on the area around the contact between the electron source layer 12 and the particle 20, thereby forming the portion of the insulating layer in which the film thickness is gradually reduced from the given thickness of the insulating layer 13. The portion of the insulating layer in which the film thickness is gradually reduced terminates on the electron source layer 12 at the edge position B within the island region 14.

Figure 5:
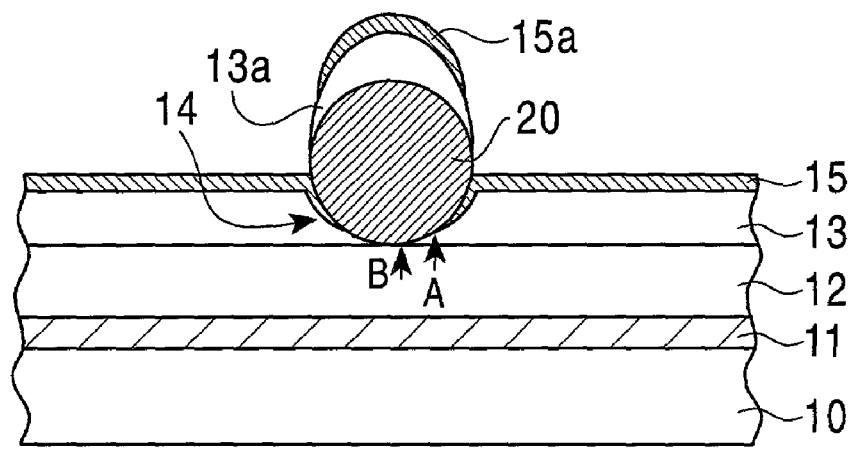

A metal 15, 15a is then deposited over the insulating layer 13 and the particle 20 as shown in FIG. 5 to form the metal thin film electrode 15. At this point, the metal is deposited also around the contacting portion of the electron source layer 12 and the particle 20, thereby forming the portion of the metal thin film electrode in which its film thickness is gradually reduced from the given thickness of the metal thin film electrode 15. The portion of the metal thin film electrode 15 in which the film thickness is gradually reduced terminates on the insulating layer 13 at the edge position A. That is, there is a boundary between the particle 20 and the electron source layer 12 or the metal thin film electrode 15, and the film thickness of the insulating layer 13 and metal thin film electrode 15 are continuously reduced from that boundary toward the contact point between the particle and the electron source layer 12. In this way, the island region 14, which is a recess, is formed within the insulating layer 13 and the metal thin film electrode 15 around the contact plane under the particle 20.

Figure 6:
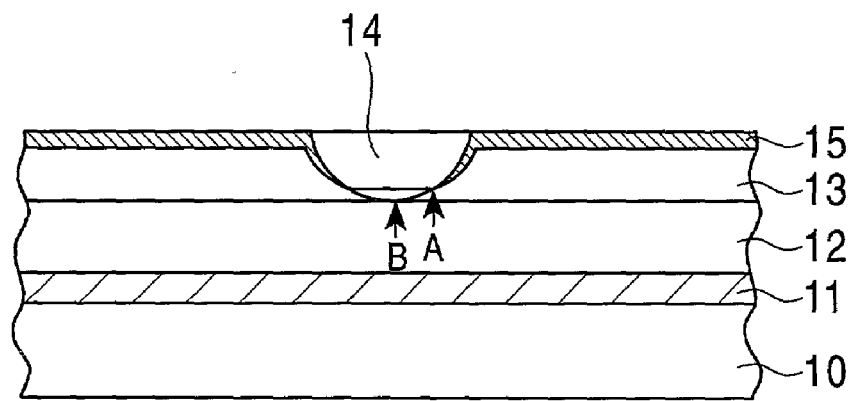

After this metal thin film electrode formation process, the plurality of particles are eliminated through ultrasonic cleaning so that a plurality of island regions 14 of circular recesses are formed as shown in FIG. 6.

Figure 7:
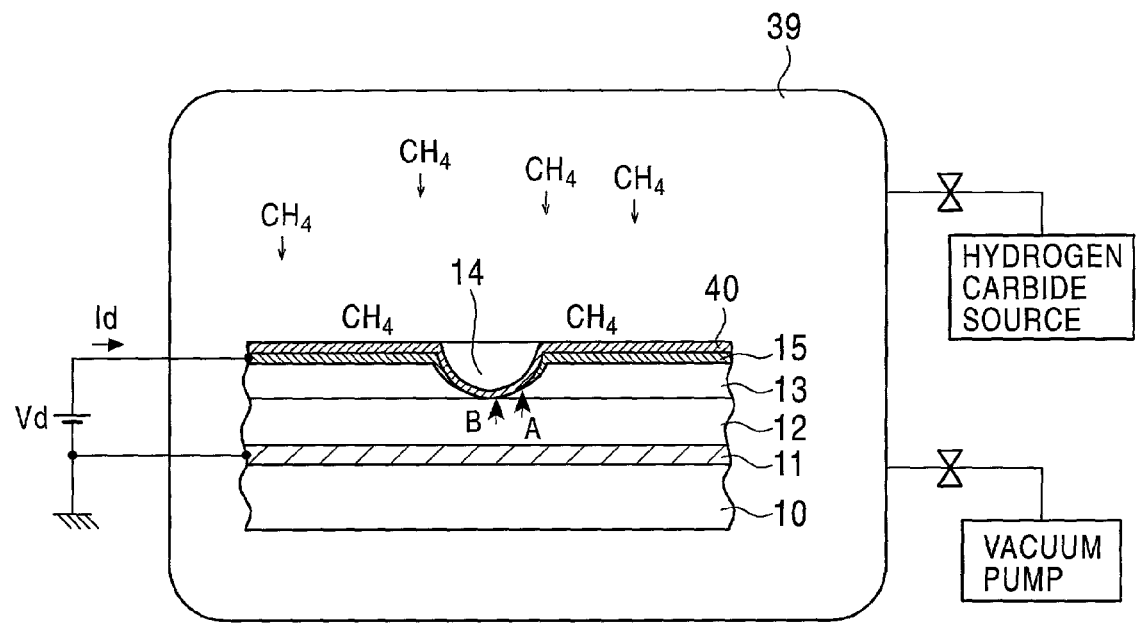
Figure 8:
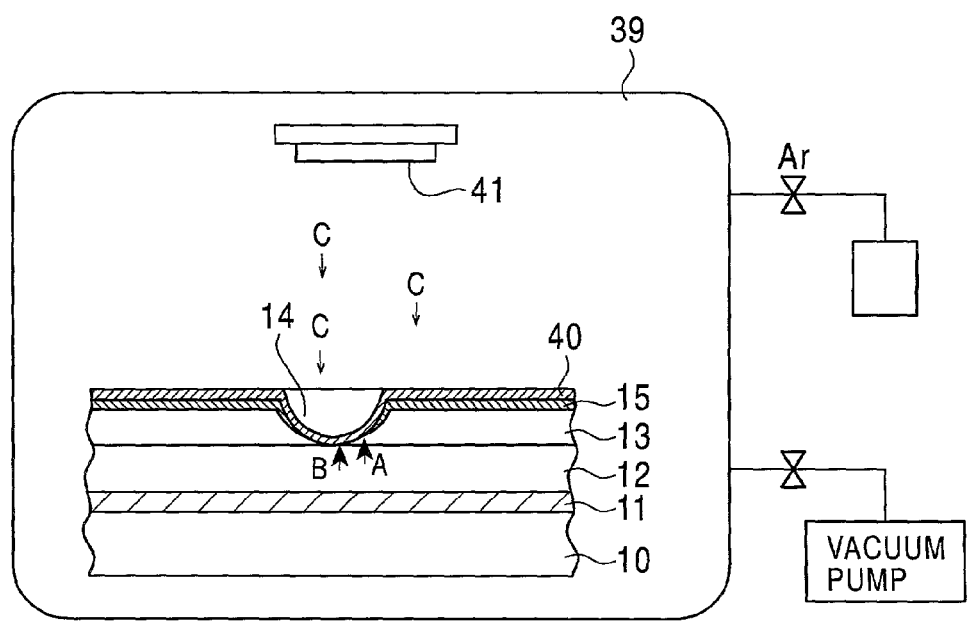

As shown in FIGS. 7 and 8, a carbon region 40 is formed as a thin film over the island regions 14 and the metal thin film electrode 15 after the mask elimination process (particle elimination process).

For the formation process of the carbon region, the substrate on which the recessed island regions are formed is placed in a vacuum chamber as shown in FIG. 7, and a hydrogen carbide gas such as methane gas is introduced into the vacuum chamber 39, and voltage is applied between the electron source layer 12 and the metal thin film electrode 15 via the ohmic electrode 11 within the hydrogen carbide atmosphere which has been vacuumed to approximately 0.1 to $1 \times 10^{-5}$ Torr. In this process, hydrogen carbide within the chamber is adsorbed to or deposited on, or reacted with the entire surface of the metal thin film electrode 15 and on the insulating layer 13 and the electron source layer 12 within the recessed island regions 14, thereby forming a thin film constituting the carbon region 40. It is preferred to set a voltage application period, and repeat the voltage application process for more than one cycle of the voltage application period.

The carbon region 40 may be formed as a thin film also by uniformly depositing it over the island regions and the metal thin film electrode 15 through sputtering with the use of a carbon target 41 as shown in FIG. 8.

Figure 9:
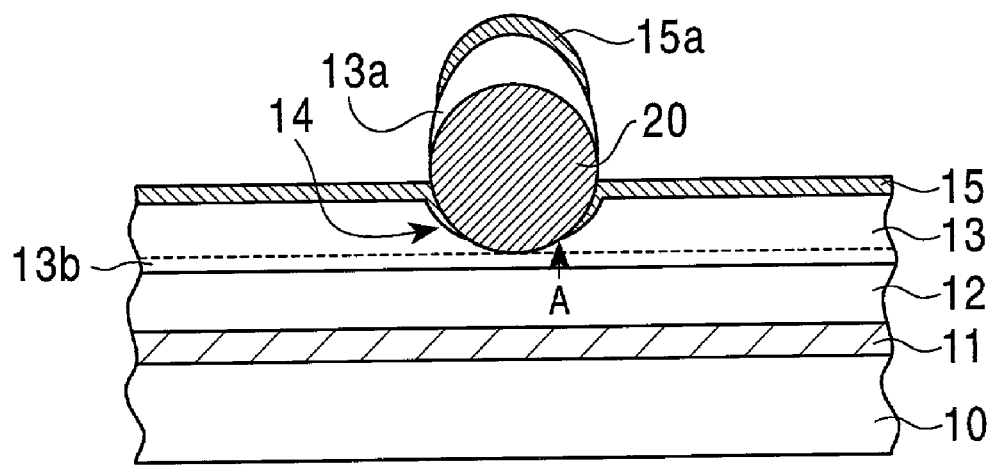
FIG. 9 is an expanded view of a portion of a device substrate during fabrication according to a manufacturing method of another electron-emitting device of the invention.

Although the fine particles 20 were explained as being placed in contact with the electron source layer 12 in the case of the above embodiments, alternatively, a preliminary insulating layer 13b may be formed immediately before the particle dispersion process (FIG. 3) through sputtering to isolate the fine particles 20 and the electron source layer 12 by that preliminary insulating layer 13b as shown in FIG. 9. In a case where the preliminary insulating layer 13b is provided, its film thickness shall be within a range from several tens to several thousands angstroms. In this way, the risk of producing short circuits between the electron source layer 12 and the metal thin film electrode 15 may be avoided.

Figure 10:
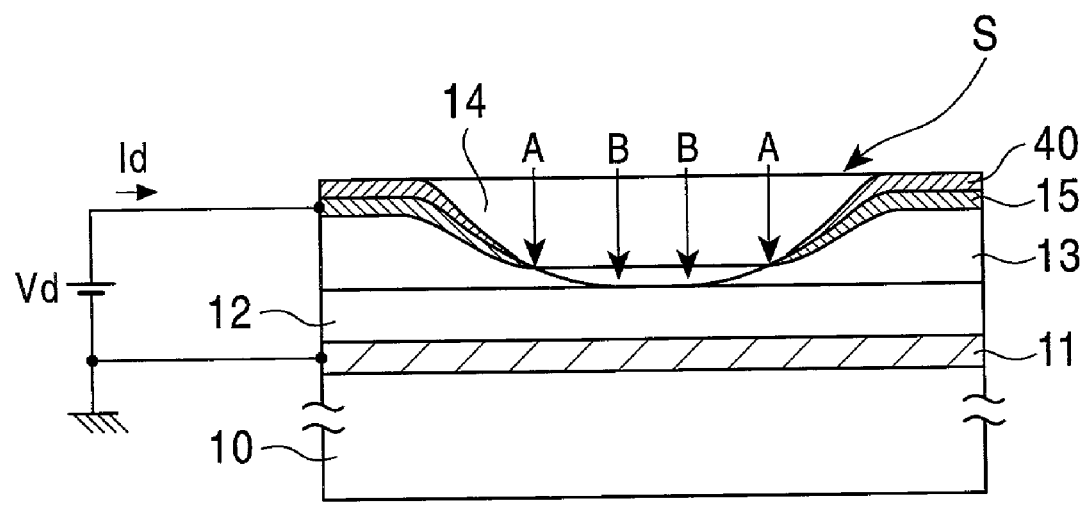
FIGS. 10 through 18 are expanded views of a portion of alternative electron-emitting devices of the invention.

Furthermore, in the case of the above embodiments, the carbon region 40 was constituted by a thin film which is deposited so as to entirely cover the metal thin film electrode 15, insulating layer 13 and electron source layer 12, however, the carbon regions 40 may alternatively be formed so as to be terminated on the insulating layer 13 or on the metal thin film electrode 15 within the island regions 14 as shown in FIG. 10. In this case, the formation process of the carbon region is performed immediately after the formation of the metal thin film electrode 15 (FIG. 5), and the carbon region 40 is deposited as a thin film on the metal thin film electrode 15 prior to the mask elimination process for eliminating the particles. The particles are then eliminated to obtain the structure shown in FIG. 10.

Figure 11:
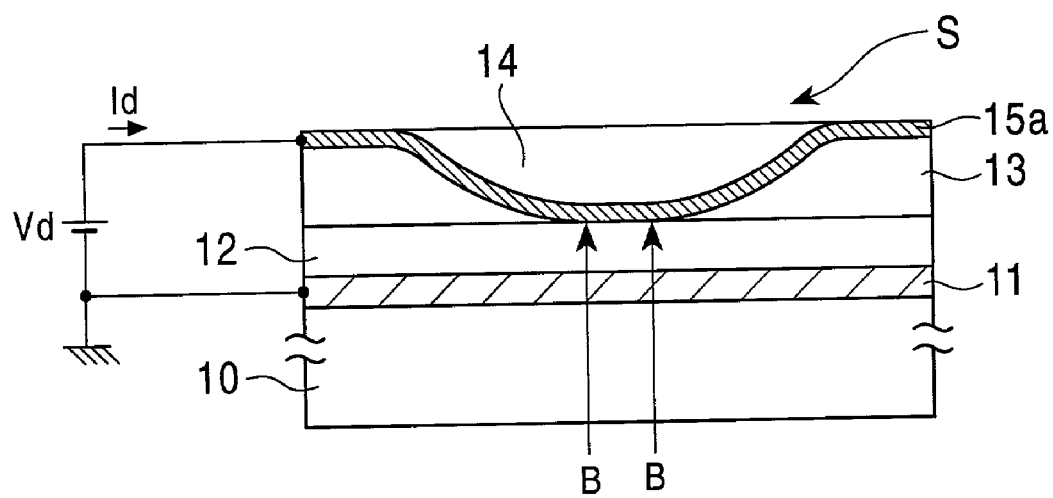

Furthermore, as shown in FIG. 11, the carbon regions may be provided as a metal thin film electrode 15a by having them distributed within the metal thin film electrode. In this case, the mask elimination process for eliminating the particles is performed after the formation process of the insulating layer 13 (FIG. 4) to form the recesses, and the formation process of the carbon region is then performed as the metal thin film electrode formation process in which the metal thin film electrode 15a containing the carbon region is formed over the insulating layer 13, with carbon or a carbon compound being mixed with the metal by using i.e. a mixed target or by sputtering within a carbon or carbon compound gas atmosphere. In this way, the structure shown in FIG. 11 is obtained.

Figure 12:
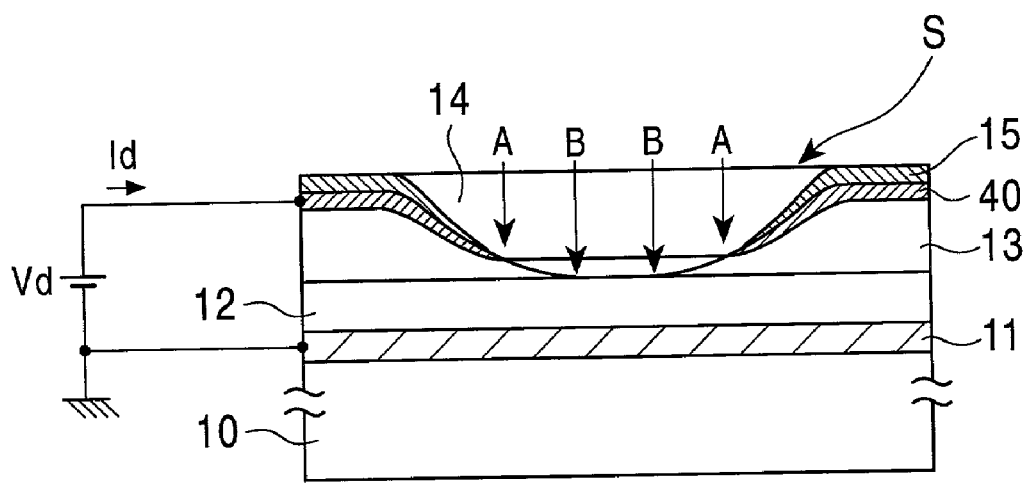

Alternatively, the carbon region 40 may be formed as a thin film deposited under the metal thin film electrode 15 within the island regions 14 as shown in FIG. 12. In this case, the forming process of the carbon region is performed after the formation process of the insulating layer 13 (FIG. 4), followed by the formation process of the metal thin film electrode 15 over the carbon region 40. In this way, the formation process of the carbon region is performed immediately before the formation process of the metal thin film electrode 15. The particles are then eliminated to obtain the structure shown in FIG. 12, in which the carbon region 40 is formed between the metal thin film electrode 15 and the insulating layer 13.

Figure 13:
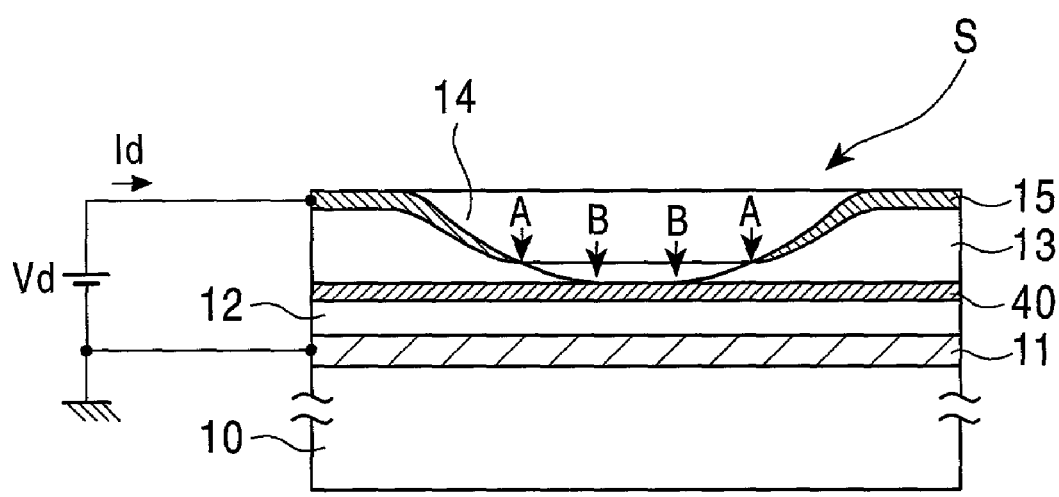

Furthermore, the carbon region 40 may also be a thin film formed between the electron source layer 12 and the insulating layer 13 as shown in FIG. 13. In this case, the carbon region 40 is evenly formed over the electron source layer 12 after the formation of the electron source layer (FIG. 2), the particles 20 are dispersed over the carbon region 40, and the processes from the insulating layer formation (FIG. 4) to the metal thin film electrode formation (FIG. 6) are then performed. In this way, the carbon region formation process is performed immediately before the dispersion process. Thereafter, the particles are eliminated to obtain the structure shown in FIG. 13, in which the carbon region 40 is formed under the insulating layer 13.

Figure 14:
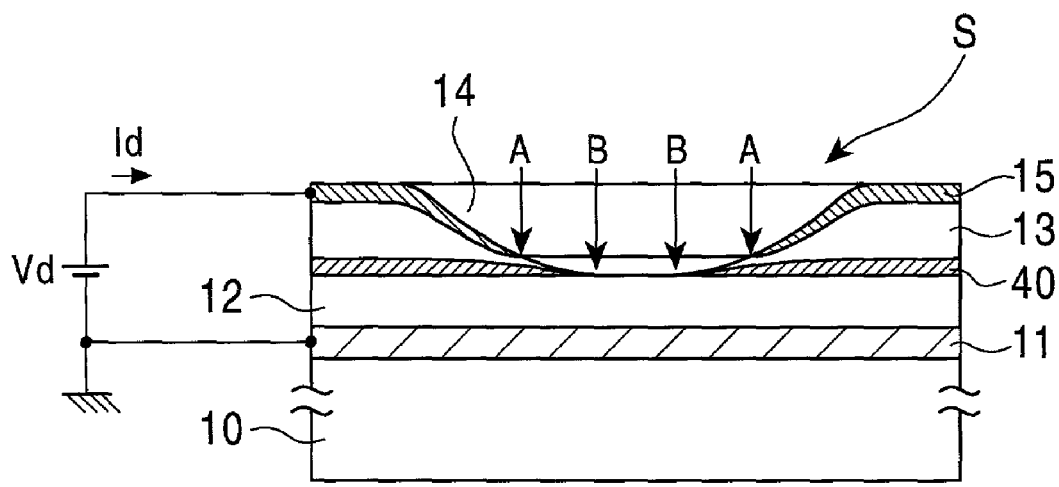

In still another embodiment, the carbon region 40 may be formed as a thin film having a thickness which is gradually reduced along with the insulating layer 13 and the metal thin film electrode 15 within the recessed island regions 14. In this case, the carbon region 40 is formed over the electron source layer 12 and the fine particles 20 after the dispersion process (FIG. 3) of the fine particles 20 on the electron source layer 13, and the processes from the insulating layer formation (FIG. 4) to the metal thin film electrode formation (FIG. 6) are then performed. In this way, the carbon region formation process is performed immediately before the insulating layer formation process. Thereafter, the fine particles are eliminated to obtain the structure shown in FIG. 14, in which the carbon region 40 constituted by the carbon thin film having a film thickness which is gradually reduced within the island regions 14, is formed under the insulating layer 13.

Figure 15:
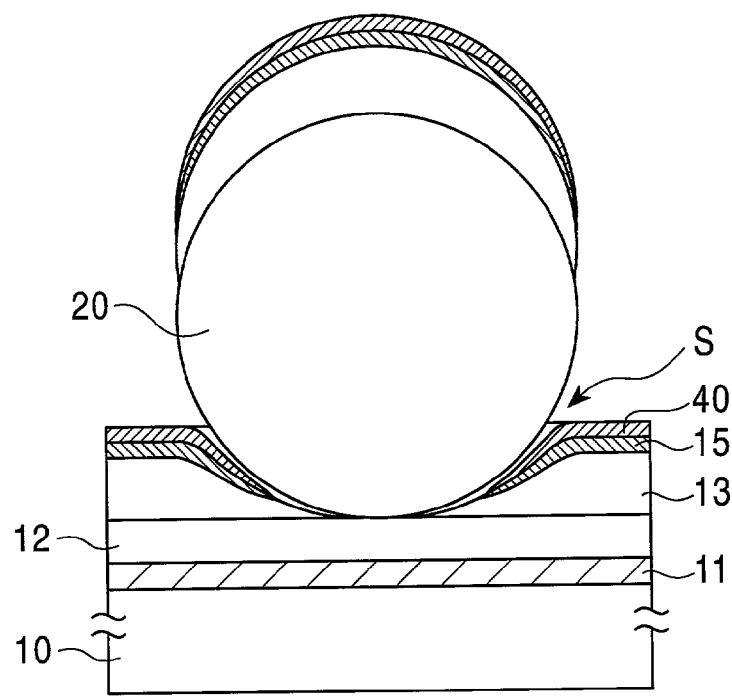
Figure 16:
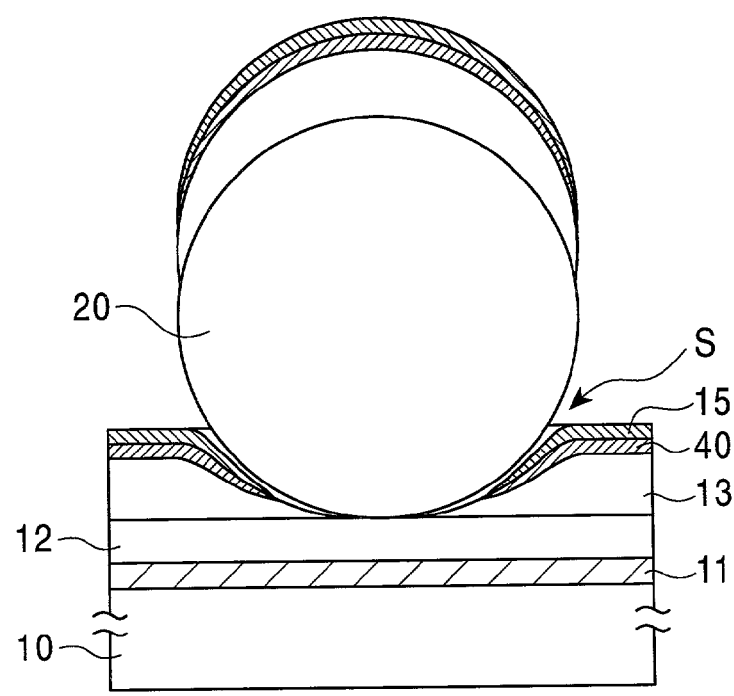
Figure 17:
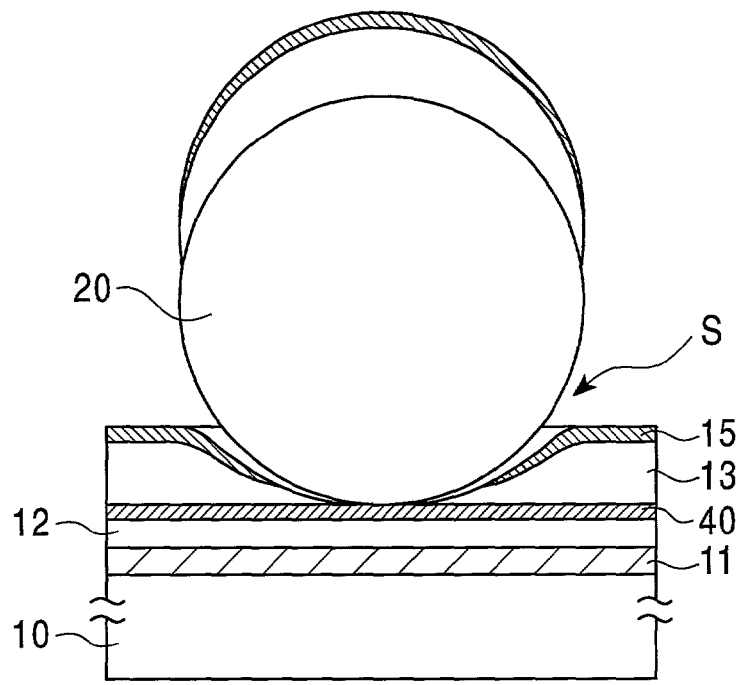
Figure 18:
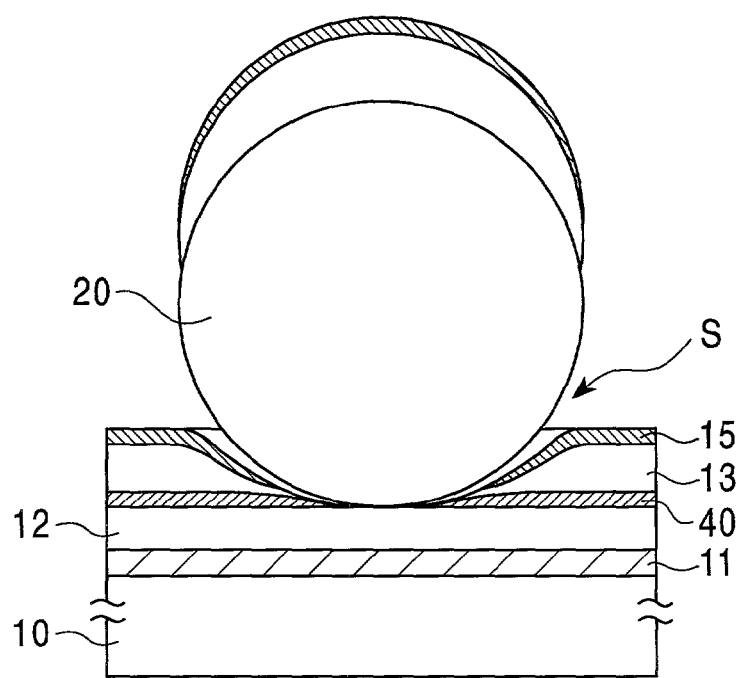

As explained heretofore, in the above embodiments, each of the island regions 14 is formed so as to constitute a recess on the flat surface of the metal thin film electrode 15 and the insulating layer 13 through the elimination of a particle 20, however, an electron-emitting device in which the particles 20 are not eliminated is also possible. For instance, by omitting the final particle elimination process shown in FIG. 6, it is possible to manufacture electron-emitting devices retaining the particles as shown in FIGS. 15 trough 18 which respectively correspond to the electron-emitting devices shown FIGS. 10 and 12 through 14. The diameter of a fine particle should be a size which allows a part of the particle geometry to be exposed, in other words, a size which does not cause the particle to be completely buried. When the thickness of the insulating layer is so large to an extent that the presence of the particles cannot be observed, then the emission current decreases.

Figure 21:
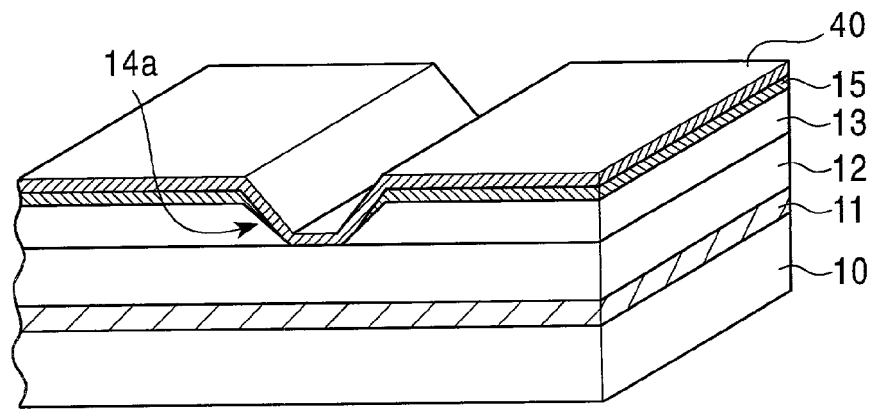
FIG. 21 is an expanded perspective view of another electron-emitting device of the invention.
Figure 24:
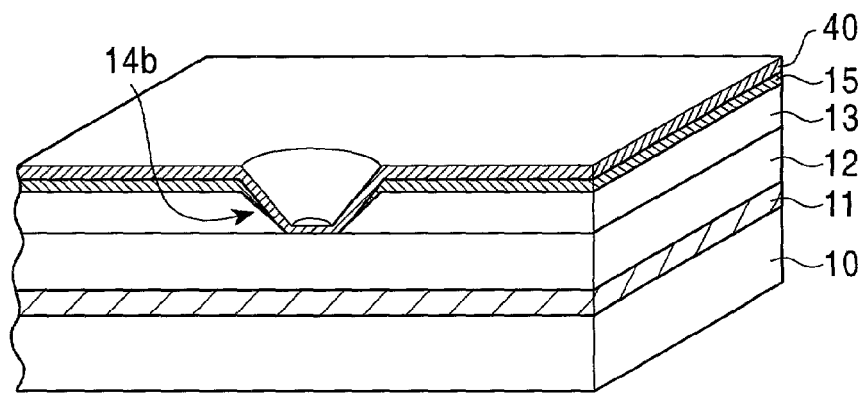
FIG. 24 is an expanded perspective view of another electron-emitting device of the invention.

Moreover, although the island regions 14 in the above embodiments are explained as being crater-like recesses 14 caused by the fine particles, the shape of the island regions is not limited to this particular shape, and the island regions may be formed as trench-like recesses 14a as shown in FIG. 21, or cone-shaped recesses 14b as shown in FIG. 24. Any arbitrary shapes (i.e. a rectangular shape) and formation methods are applicable for the island regions.

Figure 19:
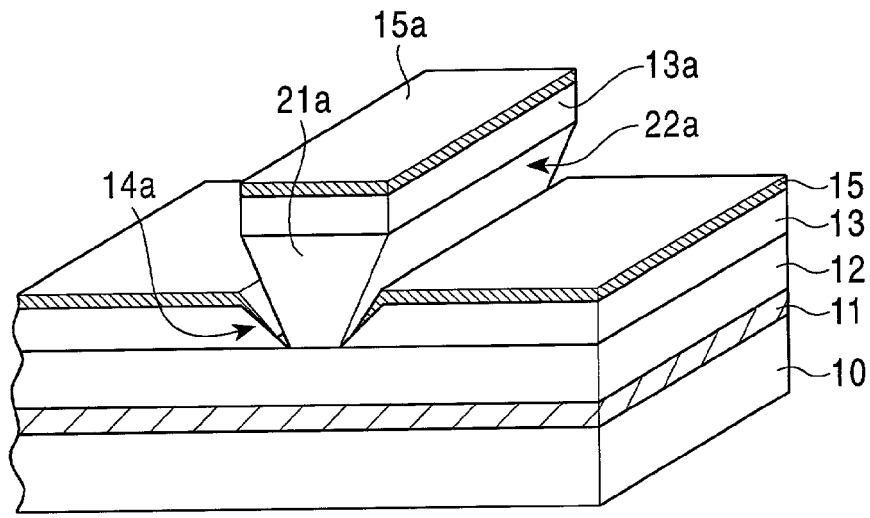
FIGS. 19 and 20 are expanded perspective views of a portion of a device substrate during fabrication according to a manufacturing method of another electron-emitting device of the invention.
Figure 22:
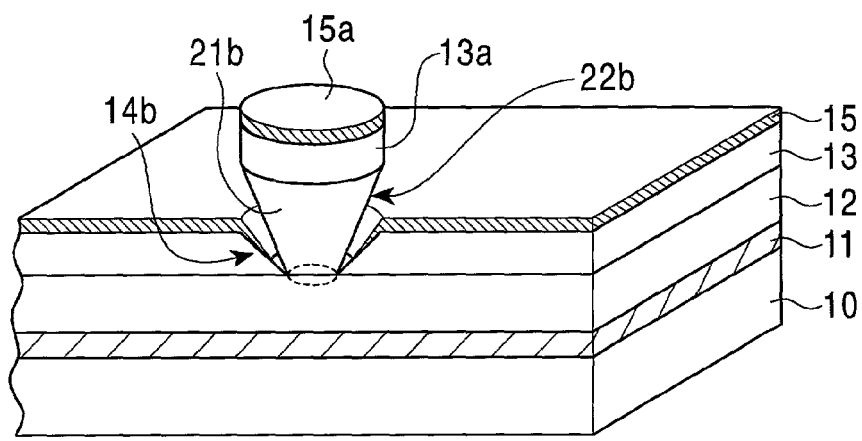
FIGS. 22 and 23 are expanded perspective views of the device substrate during fabrication according to a manufacturing method of another electron-emitting device of the invention.

The formation processes of the embodiments shown in FIGS. 21 and 24 are identical to the above-explained formation processes for the island regions, except that dot-type or line-type tapered blocks 21a and column-type reverse-tapered blocks 21b shown in FIGS. 19 and 22 are respectively used in place of the particles. Also, in either of the electron-emitting devices shown in FIGS. 21 and 24, a preliminary insulating layer may be provided, and the reverse-tapered blocks 21a, 21b may be formed thereon in the same manner as the case shown in FIG. 8 in which the preliminary insulating layer 13b is provided on the electron source layer 12.

The reverse-tapered blocks 21a and 21b are made of an electrically insulating material such as a resist. They project out in a direction normal to the substrate 10, and in their top portions, include overhangs 22a and 22b which project in a direction parallel to the substrate 10.

For the resist as the reverse-tapered block material, a novolac-type photo resist may be used. A spin-coat method is used for the application of the resist. After applying the resist to the electron source layer 12 using a photo mask, the pre-bake, exposure, post-bake and development processes are performed to form a desired resist pattern on the electron source layer. At this point, the pattern may have any arbitrary shape, but it should have a sufficient height from the Si electron source layer so that it would not be completely buried within the insulating layer which is to be formed later. The reverse-tapered block is the one having a cross-section of a reverse-tapered shape, however, the taper angle is arbitrary, and even the blocks are not necessarily be tapered blocks.

Figure 20:
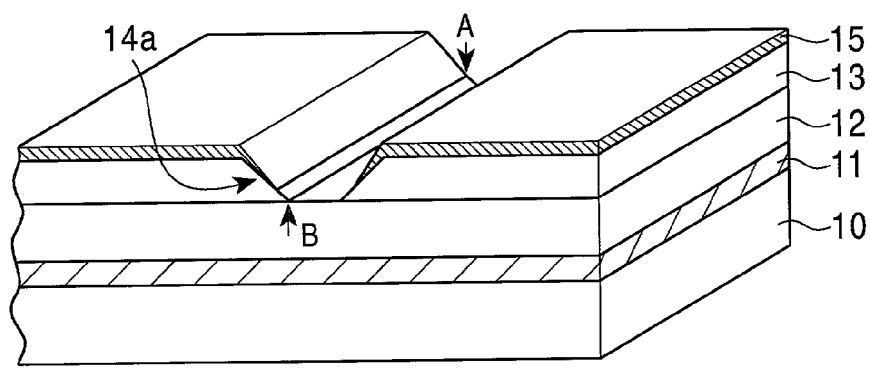
Figure 23:
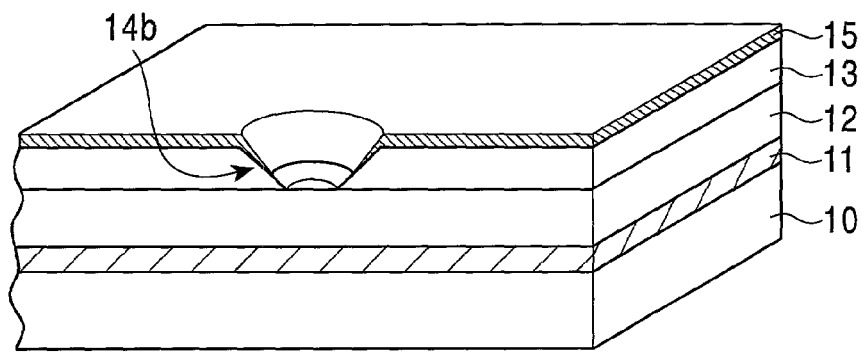

After forming the reverse-tapered resist pattern, the insulating layer 13 and the metal thin film electrode 15 are deposited so as to form island regions 14a and 14b in which the film thicknesses are gradually reduced, thereby forming the substrates shown in FIGS. 19 and 22. The reverse-tapered blocks 21a and 21b are eliminated by given agents respectively to obtain substrates, each of which having a plurality of island regions constituting the recesses shown in FIGS. 20 and 23. Thereafter, carbon regions 40 made of carbon or a carbon compound is formed over the electron source layer 12, insulating layer 13 and metal thin film electrode 15 in the same manner as in the previous embodiments, thus an electron-emitting device is constituted. It is also possible to form an electron-emitting device in which the reverse-tapered blocks 21a or 21b are not eliminated, but retained instead at the centers of these recesses formed by the island regions as shown in FIG. 19 or 22, and the carbon regions 40 are formed thereon.

{Electro-conductive Path Growth in Electron-Emitting Device}

In addition, although it is optional, after the metal thin film electrode formation process or after the fine particle elimination process, regardless of the presence or absence of the particles, an electroconductive path growing process may be performed over the device substrate 10 having the island regions 14 in which the metal thin film electrode 15 is gradually reduced in thickness and terminated on the insulating layer 13. During this electroconductive path growing process, a voltage is applied between the metal thin film electrode 15 and the electron source layer to cause a given level of current.

When the electron source layer 12 is formed of Si, the insulating layer or the carbon region located between the edge B of the insulating layer 13 and the edge A of the metal thin film electrode 15 forms a so-called "site" which serves as a current path although it has a high resistivity, so that the current first start flowing through these sites. Upon this, Joule heat is generated and the growth of electroconductive paths is promoted on the surface or the inside of the insulating layer.

Next, although Si of the electron source layer initially has a high resistivity, the electric resistance of the portions of Si located directly under these sites is locally and selectively reduced, and the amount of current in these portions increases. In this way, the electroconductive paths are collectively and uniformly gown in a shape of ring. By adding the electroconductive paths growing process in this way, undesired electrical breakdown may be avoided since Si initially has a high resistivity. This process also contributes to the stabilization of emission current of the device so obtained.

In an electron-emitting device according to the embodiments of the present invention, the island regions 14 are formed, in which the insulating layer is gradually thinned locally (in other words, the film thickness thereof is gradually reduced), and the edges of the metal thin film electrode 15 are located on the portions of the insulating layer 13 at which the film thickness is gradually reduced, and these are covered by the carbon region to form the electron-emission sections, so that even with this electron-emitting device, a sufficient level of electron emission can be obtained. However, the electroconductive path growing process may further be performed. By this process, the electroconductive minute structures present on the surface or inside of the insulating layer or carbon regions within the electron-emitting sections are grown or increased. When such a device is operated, strong fields are centered at these minute structures, and the emission is assumed to be promoted by these structures serving as emission sites. Since the electron-emitting sections having an even size, shape and condition may be formed uniformly over the entire surface of the device with the use of evenly sized and shaped particles etc., a favorable electron emission pattern may be obtained.

As for the electron emission efficiency, since only the island regions 14 in the surface of the device are functioning as the electron-emitting sources and also as the electroconductive paths, it is believed that electron emission with extremely high efficiency with no leak current can be obtained.

{Light-Emitting Device Using Electron-Emitting Device}

In a case where the electron-emitting device S is used as a light-emitting device, the device substrate 10 of the electron-emitting device S is used as the first substrate on the backside, and a translucent second substrate 1 such as one made of glass is retained as the front side substrate via a vacuumed space 4 as shown in FIG. 1. On the interior surface of the second substrate 1, a translucent collector electrode 2 made of indium-tin oxide (also referred to as ITO), tin oxide (SnO) or zinc oxide (ZnO) etc. and a phosphor layer 3R, G, B are formed. As the material of the device substrate 10, a ceramic such as $Al_2O_3$, $Si_3N_4$ or BN etc. may also be used as well as glass.

As shown in FIG. 1, the electron-emitting device is a diode with the metal thin film electrode 15 at the surface as the positive potential Vd and the ohmic electrode 11 at the backside as the ground potential. When a voltage Vd of, for example, approximately 50 V is applied between the ohmic electrode 11 and the metal thin film electrode 15 to inject electrons into the electron source layer 12, within an island region 14, the electrons travel from the edge B toward the edge A through the insulating layer 13 or the carbon region 40. The electrons reaching the metal thin film electrode 15 within the island region 14 are assumed to be partially emitted into the vacuum by a strong electric field Vc through the metal thin film electrode 15 and the adjacent carbon region 40.

The electrons e (emission current Ie) emitted from the recess formed by the island regions 14 are accelerated by the high acceleration voltage Vc (i.e. approximately 5 kV) applied to the opposing collector electrode (transparent electrode) 2, and collected to the collector electrode 2. In a case where the phosphor 3 is coated on the collector electrode, a corresponding visible light is emitted.

Electron-emitting devices according to the present invention were fabricated using an electron source layer made of boron (B)-doped Si, and characteristics are examined.

Embodiment 1

First, a flat glass substrate for the use as the backside substrate was cleaned and sufficiently dried, and on its one surface, an ohmic electrode of TiN was formed to a thickness of 220 nm through reactive sputtering with the introduction of nitrogen. Thereon, an electron source layer of Si to which B was doped to 0.15 atm % was formed in a thickness of 500 nm. In this way a plurality of electron source layer substrates were fabricated.

As shown in FIG. 5, by spraying fine particles on the electron source layer of the electron source layer substrates, particle-sprayed substrates were fabricated. In this embodiment, spherical particles (also simply referred to as spacers) having a diameter of 1.0 μm were used. The material of the particles was $SiO_2$, and the distribution range of the diameters of the particles was extremely small. For the dispersion of the particles, a known spacer spray method employed in the fabrication of liquid crystal display apparatus was used.

Among the available methods including dry-spray type methods and wet-spray type methods, a wet-spray method was used for this device.

The spherical particles were dispersed within ethyl alcohol and sufficiently stirred so that they do not cling together. This spray solution was then applied to the electron source layer of Si by spin coating, and ethyl alcohol was eliminated. In this way, the spherical particles were homogeneously coated on the Si electron source layer. The distribution density of the particles on the Si electron source layer was approximately 1000 pieces/mm$^2$. In this way, a plurality of such particle-sprayed substrates, each having particles within recesses formed by island regions, were formed.

An insulating layer of SiO$_2$ was formed in a thick ness of 330 nm via reactive sputtering with the introduction of oxygen. At this point, the particles were exposed on the surface. SiO$_2$ was of course formed also on the surfaces of the particles. The sections near the contact points (grain boundaries) between the particles and the electron source layer were the areas under the overhang portions, so that the layer in that sections was deposited by "go-around" of the sputtering gas, and the film thickness of the insulating layer was gradually reduced toward the contact points.

Thereafter, a mask having a pattern of a metal thin film electrode was placed on the SiO$_2$ insulating layer, and the metal thin film electrode made of Pt or Au was formed in a thickness of 10 nm. In this way a plurality of device substrates of the electron-emitting devices were provided. At this time, although a surface treatment for the insulating layer is not required prior to the formation of the metal thin film electrode, sputter etching may be performed over the insulating layer before forming the metal thin film electrode. It is preferred because the interfaces between the particles and the insulating layer would be etched and reformed by this sputter etch, and this would allow the electrode material to go around more effectively to reach the interfaces during the metal thin film formation, so that more effective electron emission can be promoted. When the sputter etch was performed, ring-like trails reflecting the shape of the particles were remained on the device surface. For all devices of the present embodiment, the sputter etching was performed prior to the formation of the top metal thin film electrode.

The sprayed particles were then eliminated from the substrates, thereby forming a plurality of the device substrates as the electron-emitting devices having the recessed island regions without the particles. The elimination of the particles from the electron-emitting device substrates was performed through ultrasonic cleaning with the use of isopropyl alcohol. As for the cleaning solution, water, acetone, ethanol or methanol may also be used.

The substrates on which a plurality of recessed island regions were provided by the elimination of the particles, were placed within a vacuum chamber, and a voltage is applied between the electron source layer 12 and the metal thin film electrode 15 on the substrate via the ohmic electrode under an atmosphere vacuumed to $2 \times 10^{-4}$ Torr in conjunction with the introduction of methane gas. The application of voltage was repeated for 1 to 15 cycles intermittently, with one cycle being a rise and a fall of the applied voltage between 0 V and 35 V by a one volt step in every 3 seconds. By changing the cycles and the duration, methane was adsorbed or deposited on, or reacted with the island regions of the devices, forming thin films having thicknesses varying from 0 nm to 50 nm.

As for comparative samples, a plurality of device substrates of the electron-emitting devices were fabricated in the same manner as the above embodiment, but without the introduction of methane gas into the vacuum chamber, in other words, the thin film constituting the carbon region had not been provided. For these comparative samples, only the same voltage as that in the embodiment was applied between the electron source layers and the metal thin film electrodes, so as to perform electrification repeatedly.

Separately, a transparent substrate 1 made of transparent glass having an ITO collector electrode and phosphor layer provided on its interior surface were fabricated.

The above various device substrates and the transparent substrate were placed in parallel, facing each other, with the use of spacers so that they are held at 5 mm apart, and the space therebetween was vacuumed to $10^{-7}$ Torr or $10^{-5}$ Pa to have the electron-emission devices constitute light-emitting elements.

Figure 25:
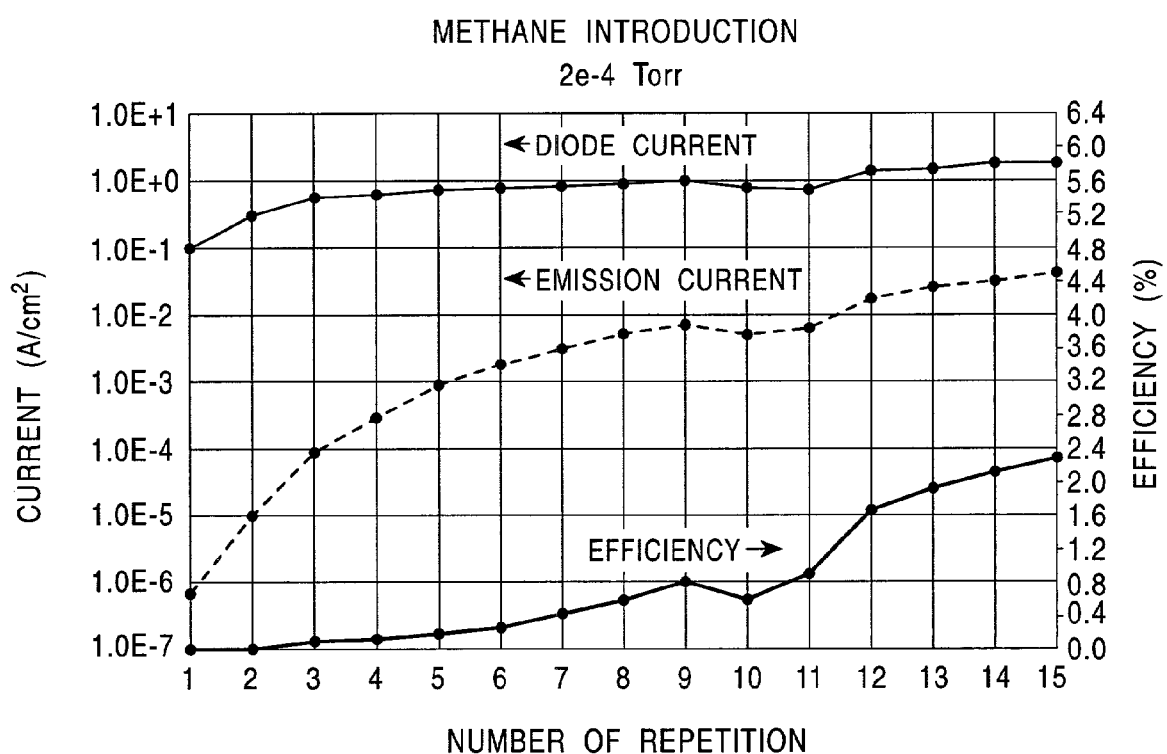
FIG. 25 is a graphical representation showing the variation in the diode current Id, emission current Ie and efficiency of the electron-emitting device according to one embodiment, plotted against the number of the repetition of the carbon-type film formation processes.
Figure 26:
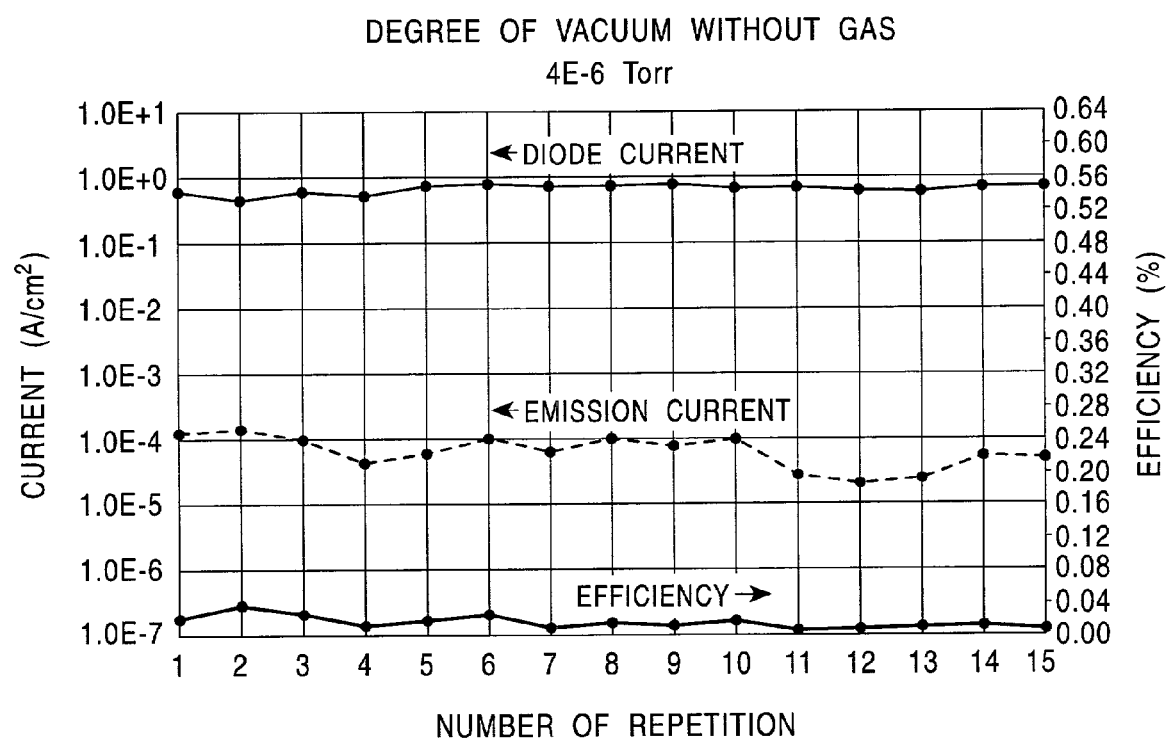
FIG. 26 is a graphical representation showing the variation in the diode current Id, emission current Ie and efficiency of a comparative electron-emitting device plotted against the number of the repetition of the electrification processes.

For the each of the fabricated light-emitting elements made of the electron-emitting devices and those comparative samples, the diode current Id, emission current Ie and the efficiency (Ie/Id) were measured while 35 V was being applied as the device voltage Vps between the metal thin film electrode and ohmic electrode. The results of these measurements are shown in FIGS. 25 and 26. In these graphs, the horizontal axis represents the repetition cycles of the carbon-type film formation process or electrification process, and the vertical axis represents the amount of current and efficiency.

As can be seen from FIGS. 25 and 26, those electron-emitting devices according to the preferred embodiment having the recessed island regions covered by the carbon films have characteristics higher than the comparative samples by two orders with regard to the emission current Ie, so that the amounts of the emission current are significantly increased. In this first embodiment, the devices capable of providing emission current over $2 \times 10^{-2}$ A/cm$^2$ and emission efficiency over 2% were obtained.

Embodiment 2

Through a sputtering method using a carbon target, carbon films were deposited in various thicknesses from 0 nm to 50 nm on respective substrates that had been fabricated in the same manner as the first embodiment (substrates having a plurality of recessed island regions through the elimination of the fine particles). As comparative samples, a plurality of device substrates of electron-emitting devices were fabricated by the same processes as the above embodiment except that the thin films forming the carbon regions were not provided to those samples. Unlike the first embodiment, the voltage application was not performed in this embodiment during the deposition of the carbon.

In the same way as the first embodiment, a transparent glass substrate 1 in which an ITO collector electrode and a phosphor layer are formed on its interior surface was fabricated, and it is assembled to form light-emitting elements of the electron-emitting devices.

Figure 27:
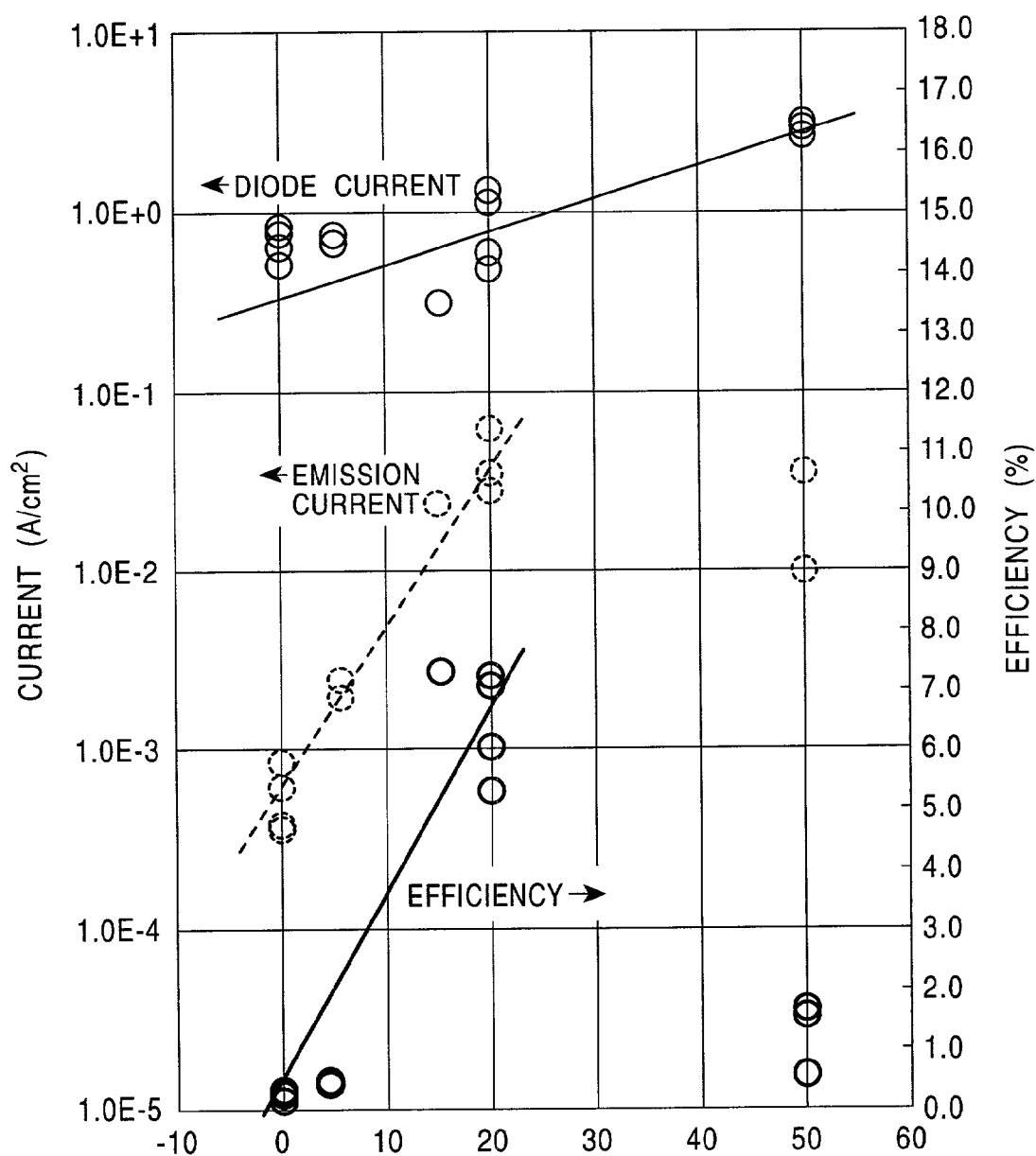
FIG. 27 is a graphical representation of the variation in the diode current Id, emission current Ie and efficiency of the electron-emitting device of the embodiment plotted against the thickness of the carbon-type film.

Device voltage of 35 V was applied between the metal thin film electrodes and the ohmic electrodes of the fabricated light-emitting elements of the electron-emitting devices and the comparative samples, and measurements were performed for diode current Id, emission current Ie and the efficiency (Ie/Id) of the elements having carbon-type film layers in various thicknesses. FIG. 27 shows the relationship between the thicknesses of the carbon-type film layers, and the amounts of current and efficiency of the respective devices.

Those electron-emitting devices according to the second embodiment, having recessed island regions covered by carbon-type films by sputtering had characteristics higher than the comparative samples by two orders, indicating significant increase in their emission current. In this second embodiment, devices capable of providing emission current over $4 \times 10^{-2}$ A/cm$^2$ and emission efficiencies over 6% were obtained.

Furthermore, with the condition of either one of the above embodiment, devices were fabricated to have film thicknesses ranging from 50 nm to 1000 nm with the total thicknesses of their insulating layers being 50 nm or greater, and through the application of a voltage 200 V or lower, their emission efficiencies were measured to see the variation in the electron emission efficiencies Ie/(Ie+Id)×100% relative to the thicknesses of the insulating layers. The results of the measurements indicated that emission efficiencies of 0.1% or greater can be obtained with devices having film thicknesses between 50 nm and 1000 nm with the thicknesses of their insulating layers being 50 nm or greater.

Furthermore, it was confirmed that devices having Si electron source layer not doped with B would have the same effect.

{Other Structures of The Electron-Emitting Device}

In the above embodiments, the electron-emitting device was explained as having recesses or trench-like regions, in which the film thickness is gradually reduced toward the center of the island regions 14, however, the device may have island regions in which the insulating layer and metal thin film electrode gradually reduce together off the center of the island regions or gradually reduce asymmetrically, or gradually reduce as a flat section.

Figure 28:
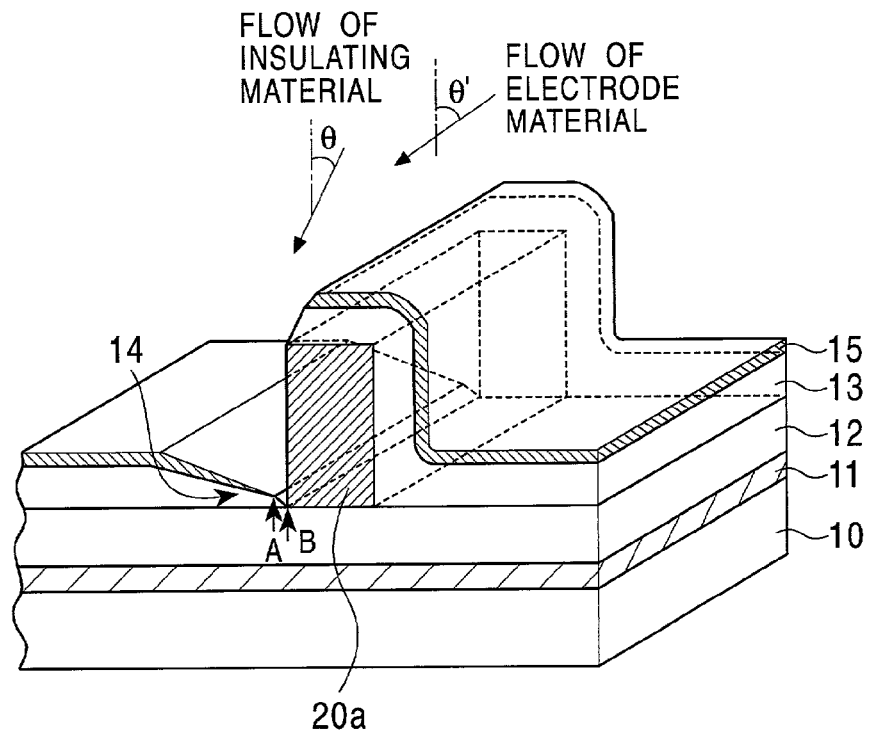
FIG. 28 is an expanded perspective view of a portion of a device substrate during the fabrication of another electron-emitting device of the invention.

For example, as another embodiment of the present invention, an island region 14 in which the film thicknesses of the insulating layer 13 and the metal thin film electrode 15 gradually reduce together toward a masking wall 20a, may be provided on one side of a trench-like recess as shown in FIG. 28.

The island region 14 shown in FIG. 28, which constitutes a portion of the trench-like recess, may be formed as follows. First, a masking wall 20a made of a resist etc. is formed in the same manner as the line-type tapered block 21a shown in FIG. 19 on a substrate 10 having an ohmic electrode 11 and an electron source layer 12 sequentially formed thereon. An insulating layer 13 is then formed by sputtering. In this sputtering process, the surface of the electron source layer 12 on the substrate 10 is so disposed to have a tilt relative to the flowing direction of the sputtered insulating material, so that the resultant insulating layer 13 would have, on one side of the masking wall 20a, a portion in which a smaller amount of insulating material is deposited, or a portion in which the thickness of the insulating layer is gradually reduced toward the masking wall 20a. Then in the next process, the surface of the insulating layer 13 on the substrate 10 is so disposed to have a tilt relative to the flowing direction of a sputtered metal thin film electrode material, so that the resultant metal thin film electrode 15 would have, on one side of the masking wall 20a, a portion in which a smaller amount of the metal thin film electrode material is deposited, or a portion in which the thickness of the metal thin film electrode is gradually reduced.

As indicated in FIG. 28, in these "tilted" sputtering processes of the insulating layer and metal thin film electrode, when angles of the substrate 10 in a sputtering apparatus are selected so as to allow the incidence angle θ' of the flow of the sputtered metal thin film electrode material to be larger than the incidence angle θ of the flow of the sputtered insulating material, the resultant island region 14 would then have a structure in which the metal thin film electrode 15 terminates at an edge A located on the insulating layer 13. The insulating layer 13 within the island region 14 terminates at an edge B located on the electron source layer 12.

Figure 29:
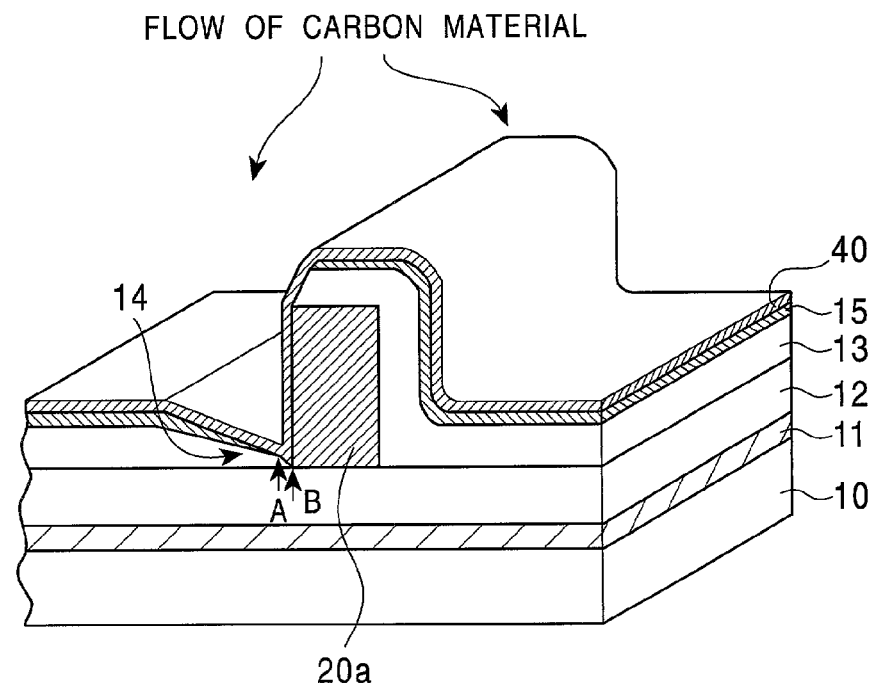
FIG. 29 is an expanded perspective view of the portion of another electron-emitting device of the invention.

Thereafter, over the exposed portions of the masking wall 20a and insulating layer 13, and over the metal thin film electrode 15, a carbon region 40 made of carbon or a carbon compound is formed by sputtering a carbon or carbon compound material in the similar manner as the above processes, thereby completing an electron-emitting device as shown in FIG. 29. The masking wall 20a and the deposits thereon may be eliminated through etching etc. to form the carbon region 40 over a structure in which the electron source layer 12 is exposed.

Figure 30:
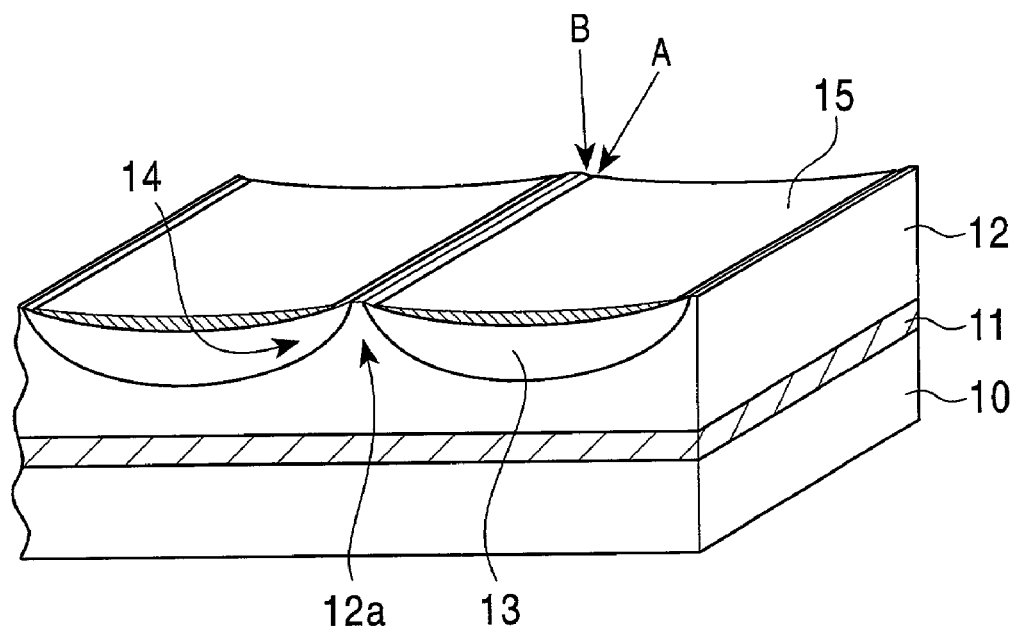
FIGS. 30 and 31 are expanded perspective views of a portion of a device substrate during fabrication according to still another manufacturing method of an electron-emitting device of the invention.
Figure 31:
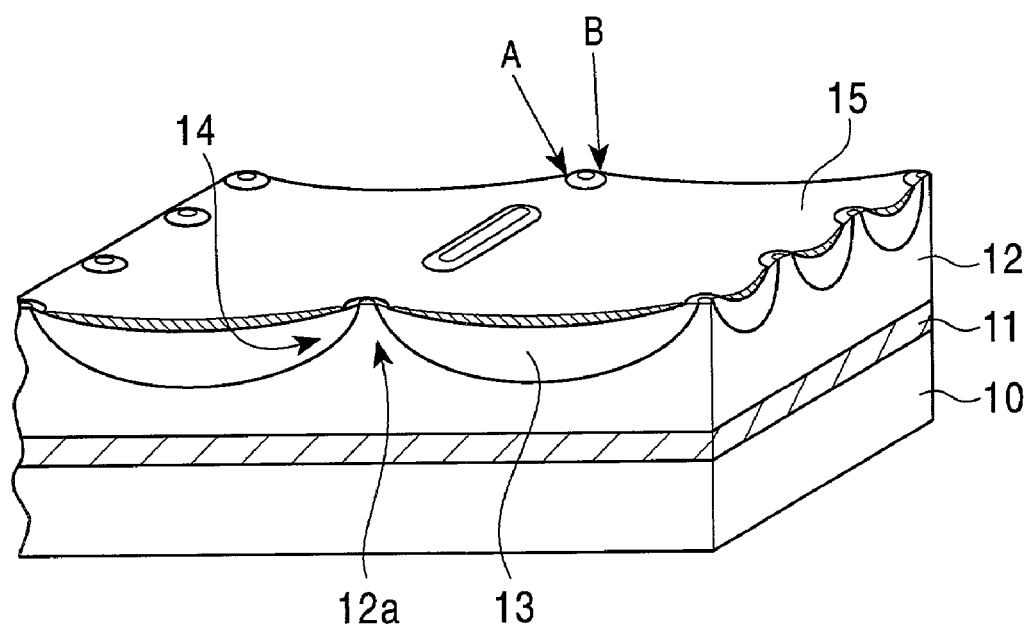

In the above embodiment, the island region was explained as being formed as a recess, however, the island region may be formed as a flat or convex structure in which the thicknesses of the insulating layer 13 and the metal thin film electrode 15 are gradually reduced. For example, as another embodiment, a flat or convex island region 14 in which the film thicknesses of the insulating layer 13 and the metal thin film electrode 15 are gradually reduced toward a peak of a spiked portion 12a of the electron source layer 12 as shown in FIG. 30. This flat or convex island region 14 is formed by techniques such as photolithography and etching etc. with the use of a dot-type or linear mask. The spiked portions 12a of the electron source layer 12 may be formed as ribs as shown in FIG. 30, or individual convex features distributed over the surface as shown in FIG. 31. In these cases also, the metal thin film electrode 15 terminates at the edge A located on the insulating layer 13, and the insulating layer 13 terminates at the edge B located on the electron source layer 12. It is also possible to form a device having a structure in which the electron source layer 12 is completely covered by laying the insulating layer 13 over the peaks 12a of the electron source layer 12.

Figure 32:
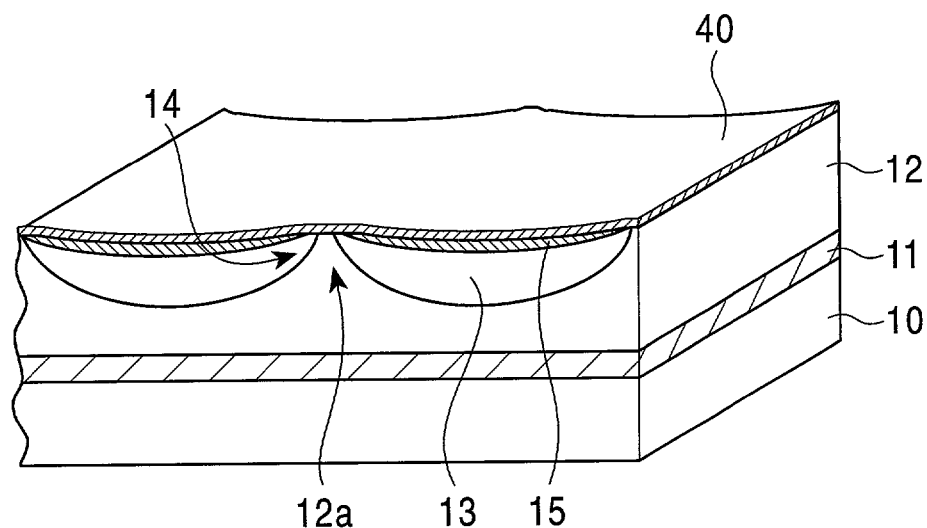
FIG. 32 is an expanded perspective view of a portion of another electron-emitting device of the invention.

Thereafter, as shown in FIG. 32, a carbon region 40 made of carbon or a carbon compound is formed over the exposed portions of the insulating layer 13 and electron source layer 12 and the metal thin film electrode 15 in the same manner as the prior embodiments, thereby completing an electron-emitting device.

{Display Apparatus Using The Electron-Emitting Devices}

Figure 33:
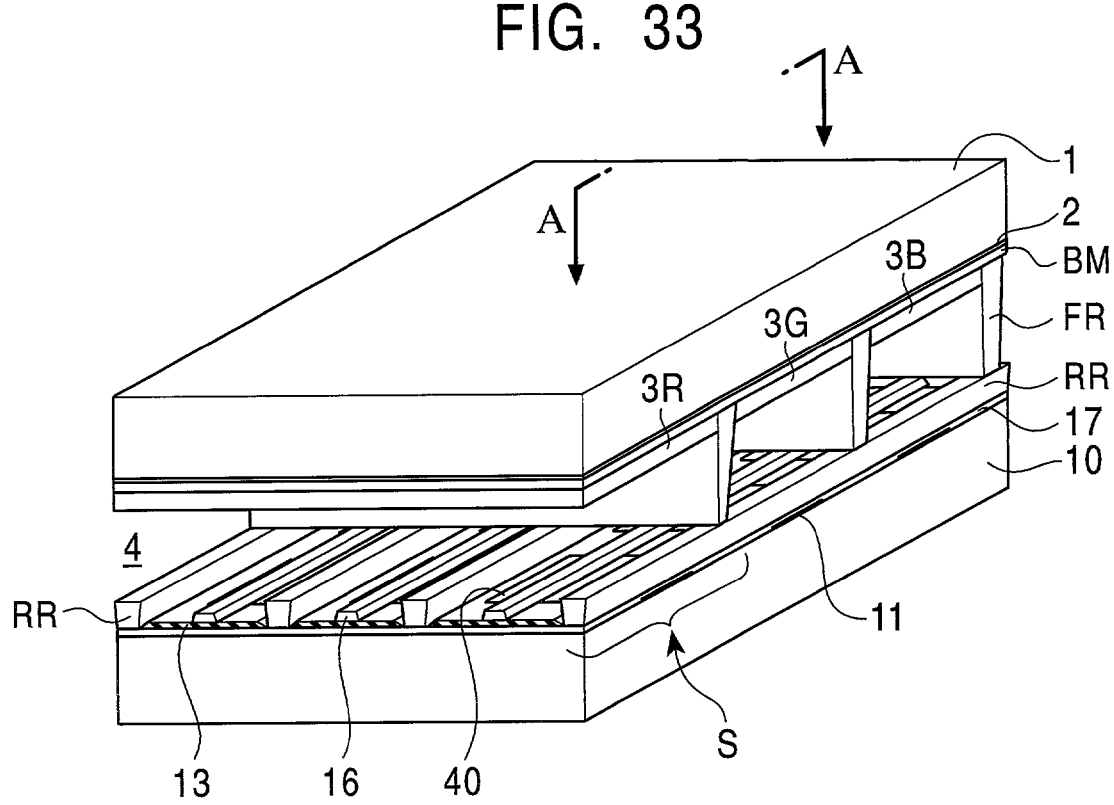
FIG. 33 is a schematic perspective view showing a portion of an embodiment of an electron-emitting-device flat panel display apparatus according to the invention.
Figure 34:
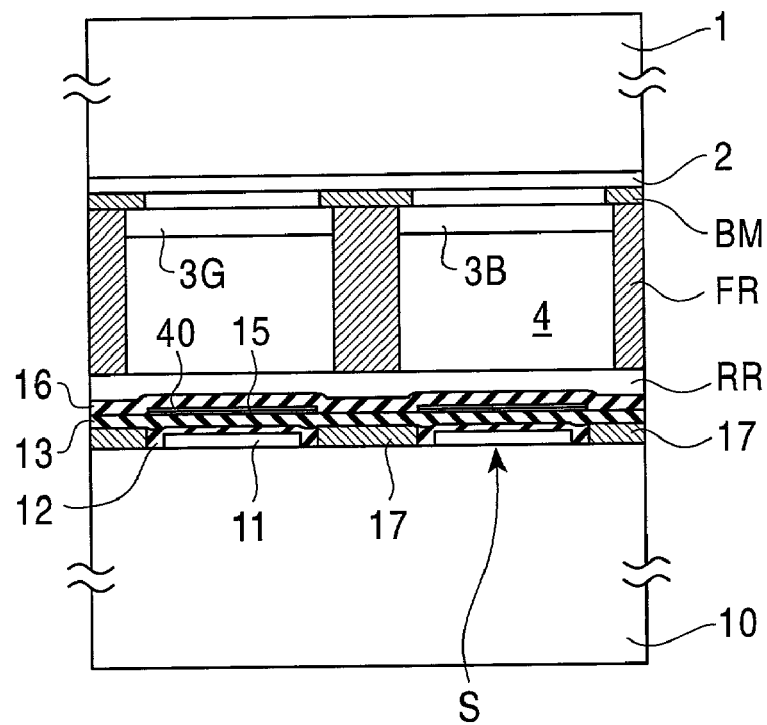
FIG. 34 is an expanded schematic cross-sectional view showing a portion of the embodiment of the electron-emitting-device flat panel display apparatus taken along the line AA of FIG. 33.

FIG. 33 shows a flat panel display apparatus using the electron-emitting devices according to an embodiment of the present invention. FIG. 34 shows a partial cross-sectional view of the flat panel display apparatus.

On the interior surface (on the side of a vacuumed space 4) of a backside substrate 10, a plurality of ohmic electrodes 11 extending in parallel to each other are formed. Every 3 ohmic electrodes 11 are grouped as one set, corresponding to red, green and blue color signals R, G and B so as to allow the apparatus to function as a color display panel, so that a specific signal is applied to each of them. A plurality of electron-emitting devices S are arranged along a common ohmic electrode 11. A plurality of bus lines 16 extend in parallel to each other, each of them being formed on the portions of the carbon regions 40 provided on metal thin film electrodes 15 of adjoining devices for providing electrical connections, and is vertically extended to ohmic electrodes 11. An intersection of a bus electrode 16 and an ohmic electrode 11 corresponds to an electron-emitting device S.

Accordingly, either the simple matrix method of active matrix method is applicable as the driving method of the display apparatus of the invention.

An electron-emitting device S, as shown in FIG. 34, comprises an electron source layer 12, an insulating layer 13, a metal thin film electrode 15 and a carbon region 40 covering island regions, that are sequentially formed on the ohmic electrode 11. The carbon region 40 may face to the interior vacuumed space as shown in FIG. 1. The device has a plurality of island regions homogeneously distributed, in which the film thicknesses are is gradually reduced in the same direction as the interface with the carbon region 40 such as those shown in FIGS. 10–18, 21, 24, 29 and 32. In FIGS. 33 and 34, the indication of the plurality of island regions as recesses are omitted, however, it is assumed herein that a plurality of island regions have been provided homogeneously in the insulating layer 13 and the metal thin film electrode 15.

It should be noted that insulating supporting members 17 are provided, encompassing individual electron-emitting devices S to segregate them into a plurality of electron-emitting regions. The insulating supporting members 17 support the bus electrodes 16, and prevent them from being broken. That is, the supporting members 17 should be formed beforehand with a material having a high insulation performance or electric resistance on the periphery sections outside the areas where the electron-emitting devices S are to be formed. These supporting members 17 should be formed in a thickness approximately equal to the final thickness of the electron-emitting devices that are formed in the subsequent processes.

In this embodiment, partition walls RR on the backside substrate are formed on the insulating supporting members 17, so as to project out from the backside substrate 10 into the vacuumed space 4. The partition walls RR are disposed at a given interval. In FIG. 33, one partition wall RR is formed for every column of the electron-emitting devices S at a location between two adjacent columns, however, it may be formed intermittently by leaving only a part of its top area including the portions for abutting against a second partition wall FR formed on the front substrate 1.

Furthermore, it is preferred that the top surface area of this partition wall RR is formed larger than the bottom surface area, in other words, it is preferred to form the partition wall RR so as to include overhangs in its top portion, projecting in a direction substantially parallel to the backside substrate.

The bus electrodes 16 provided on the metal thin film electrodes 15 on the backside substrate 10 is illustrated as having a simple linear shape in FIG. 33, however, the bus electrodes 16 is preferably formed, instead of in the simple linear shape, in a shape having wider sections on the areas between the metal thin film electrodes 15 of electron-emitting devices and narrower sections on the metal thin film electrodes 15, in other words, a larger width over the areas between electron-emitting devices and a smaller width over the devices. In this way, the resistivity of the bus electrodes may be reduced.

As for the materials of the ohmic electrode 11, a material typically used in IC wiring, such as Au, Pt, Al, W or the like may be used, but a 3-layer structure of chrome-nickel-chrome, an alloy of Al and Nd, an alloy of Al and Mo or an alloy of Ti and N may also be used as well. Its thickness should be uniform to be able to supply substantially the same amount of current. Although it is not particularly indicated in FIG. 33, an insulating layer made of an insulator such as $SiO_x$, $SiN_x$, $Al_2O_3$, AlN or the like may be provided between the backside substrate 10 and the ohmic electrodes 11. The insulating layer serves to prevent the adverse effect from the backside glass substrate 10 (elution of impurities to alkaline components etc. or unevenness in the substrate surface) over the devices.

The material of the metal thin film electrode 15 is preferably one having a small work function $\phi$ in light of the principle of the electron emission. To maximize the electron emission efficiency, the material of the metal thin film electrode 15 is preferably selected from the group I and II metals, for example, Cs, Rb, Li, Sr, Mg, Ba and Ca etc., or an alloy thereof. Furthermore, a chemically stable metal having high electroconductivity is also preferable as the material of the metal thin film electrode 15. For example, Au, Pt, Lu, Ag or Cu, or an alloy thereof is desirable. These metals coated or doped with any of the above metal explained as having a small work function are similarly effective.

As for the material of the bus electrode 16, a material typically used for IC wiring, such as Au Pt, Al, Cu or the like may be used. A sufficient thickness should be selected for providing substantially the same amount of current to each of the devices, and the adequate thickness is between 0.1 µm and 50 µm. However, if the resistivity is tolerable, the material used for the metal thin film electrode may be used instead of the bus electrode.

On the interior surface (surface facing the backside substrate 10) of the translucent front substrate 1, such as a transparent glass substrate, serving as a display screen, a transparent collector electrode 2 is formed integrally, and a high voltage is applied thereto. When using black stripes or a back metal, it may be utilized as the collector electrode, so that in this case, the formation of ITO is unnecessitated.

Over the collector electrode 2, front ribs (second partition walls) FR are formed in plurality in parallel to the ohmic electrodes 11. Over the collector electrode 2 between the elongated front ribs, phosphor layers 3R, 3G and 3B made of respective phosphors corresponding to R, G and B are respectively formed so as to face to the vacuumed space 4. In this way, at the boundaries between each of the phosphor layers, the front ribs (second partition walls) FR for retaining a constant spacing (i.e. 1 mm) between the backside substrate and the front substrate are provided, thereby ensuring the segregation of the phosphors on the front-side substrate that correspond to the three primary colors of light R, G and B respectively.

As explained in the above, the flat panel display apparatus using the electron-emitting devices according to the present invention has the image display array comprising a plurality of light-emitting pixels, corresponding to the electron-emitting devices, arranged in a matrix, each constituted as either a red R, green G or blue B light-emitting section. It is of course possible also to form a monochrome display panel by replacing the RGB light-emitting sections with monochrome light-emitting sections.

Figure 35:
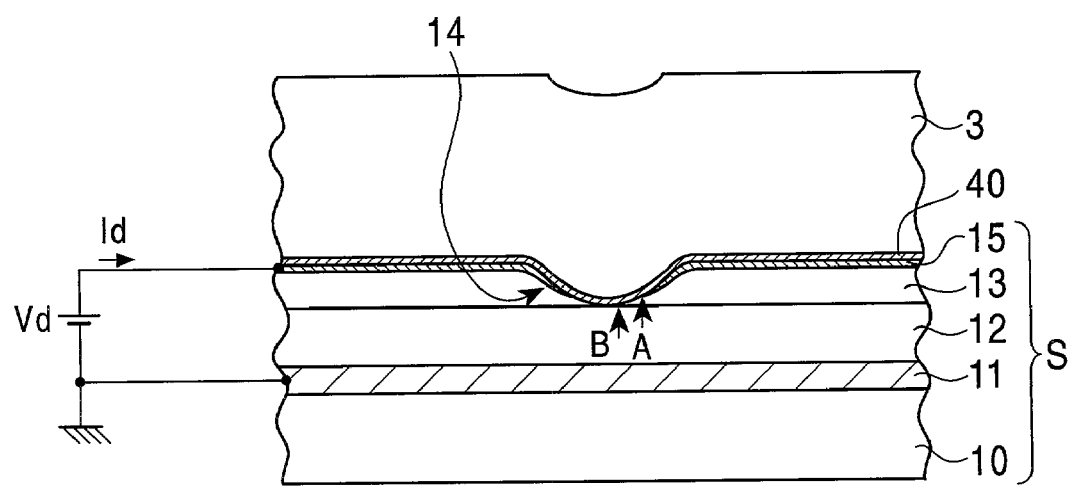
FIG. 35 is a schematic cross-sectional view of an embodiment of an electron-emitting light-emitting device according to the invention.

According to still another embodiment of the present invention, as shown in FIG. 35, an electron-emitting light-emitting device 30 can be obtained. An electron emitting device S as implemented in the electron-emitting light-emitting device 30, is constructed in a similar manner as the above embodiments, in which; an electron source layer 12 is formed on a glass device substrate 10 as the backside substrate having an ohmic electrode 11 formed thereon; a plurality of spherical particles are sprayed, or a plurality of linear or column-like reverse-tapered blocks are formed thereon; an insulating layer 13 and a metal thin film electrode 15 are deposited thereon; the particles etc. are eliminated; and a carbon region 40 made of carbon or a carbon compound is formed over the recessed island regions 14 and the metal thin film electrode 15.

Figure 36:
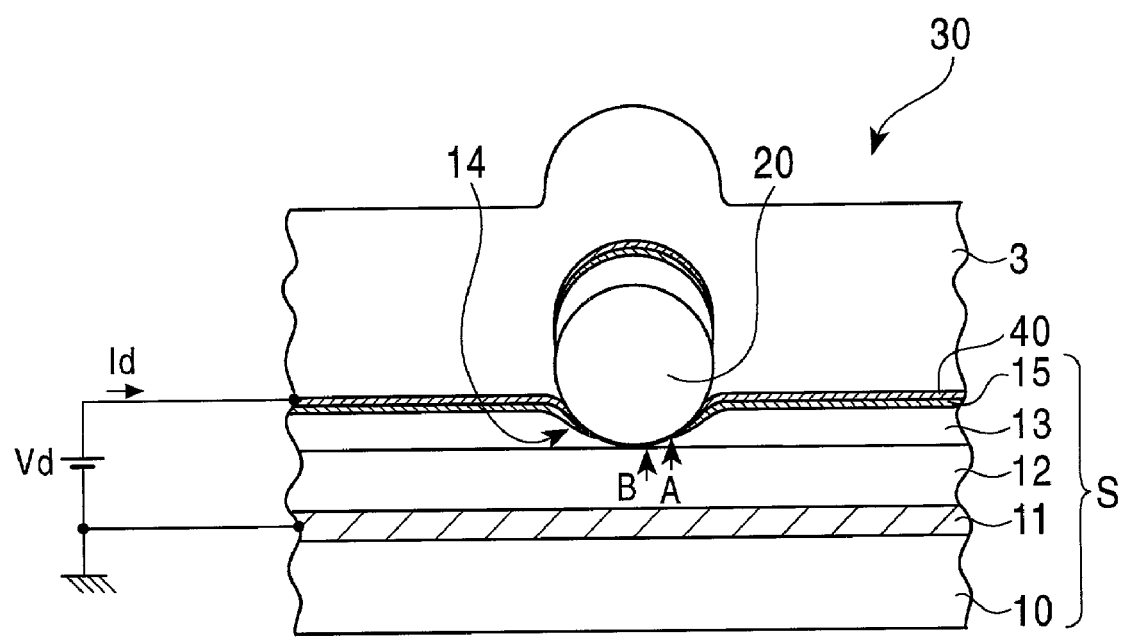
FIG. 36 is a schematic cross-sectional view of another embodiment of an electron-emitting light-emitting device according to the invention.

Over this carbon region 40 of the electron-emitting device according to the present embodiment, a phosphor layer 3 is directly formed, thereby completing the electron-emitting light-emitting device. The phosphor layer 3 directly receives the electrons generated from the island regions 14 of the electron-emitting device, and emits a visible light corresponding to the type of the phosphor. The electron-emitting light-emitting device 30 may be the one in which the particles 20 (or reverse tapered blocks) are retained, and the carbon region 40 is applied over them as shown in FIG. 36.

The phosphor layer 3 may be formed by a spin-coating method using a solution of phosphor for the emission of a desired color of light, however the application method is not limited.

It is also possible to provide over the phosphor layer, a translucent front surface substrate such as a glass substrate having a transparent collector electrode provided on its interior surface, mainly for the protection of the device. This would allow the collection of those electrons leaked from the electron-emitting light-emitting device. These opposing front and the backside substrates of this electron-emitting light-emitting device may be bonded via a transparent adhesive, with the support of spacers etc. at their peripheries.

According to the configuration of this alternate embodiment of the invention, since the device would have a phosphor layer directly provided on the metal thin film electrode or the carbon region of the electron-emitting device, the application of accelerating power is unnecessitated, the driving system of the apparatus may be simplified, and a vacuumed space is no longer required, thus, a lightweight and ultra-thin flat panel display apparatus may be obtained. Furthermore, since it would not require excessive spacers, the visibility may also be improved.

What is claimed is:

1. An electron-emitting device comprising:
    an electron source layer made of one of a metal, a metal alloy and a semiconductor;
    an insulating layer formed on said electron source layer, said insulating layer having at least one island region serving as an electron-emitting section in which film thickness of said insulating layer is reduced;
    a carbon region made of one of carbon and a carbon compound provided on at least one of bottom and inside of said island region, the carbon region being disposed having a vacuum space directly over the carbon region; and
    a metal thin film electrode formed on said insulating layer,
    wherein the electron source layer directly interfaces the carbon region at a center of the island region with the electron source layer facing the vacuum space via the carbon region at the center of the island region,
    wherein electrons are emitted upon application of an electric field between said electron source layer and said metal thin film electrode.

2. An electron-emitting device as claimed in claim 1 wherein said metal thin film electrode and said carbon region are deposited by one of a physical deposition method and a chemical deposition method.

3. An electron-emitting device as claimed in claim 1 wherein said carbon region is a thin film deposited on one of said island region and said metal thin film electrode.

4. An electron-emitting device as claimed in claim 1 wherein said carbon region is a thin film deposited on said island region while a voltage is being applied between said electron source layer and said metal thin film electrode.

5. An electron-emitting device as claimed in claim 4 wherein said applied voltage is supplied intermittently according to a voltage application period in which the voltage rises and falls.

6. An electron-emitting device as claimed in claim 1 wherein said carbon region is a thin film deposited under said metal thin film electrode.

7. An electron-emitting device as claimed in claim 1 wherein said carbon region is a thin film deposited under said insulating layer.

8. An electron-emitting device as claimed in claim 1 wherein the thickness of said metal thin film is gradually reduced in conjunction with said insulating layer.

9. An electron-emitting device as claimed in claim 1 wherein the thickness of said carbon region is gradually reduced in conjunction with said insulating layer.

10. An electron-emitting device as claimed in claim 1 wherein said insulating layer is made of a dielectric material and has a thickness of at least 50 nm in areas other than said island region.

11. An electron-emitting device as claimed in claim 1 wherein said metal thin film electrode terminates on said insulating layer in a manner such that a thickness thereof is gradually reduced within said island region.

12. An electron-emitting device as claimed in claim 1 wherein said insulating layer terminates on said electron source layer within said island region.

13. An electron-emitting device as claimed in claim 1 wherein said island region is a recess on a flat surface of said metal thin film electrode and said insulating layer.

14. An electron-emitting device as claimed in claim 1 further comprising a fine particle within said island region.

15. An electron-emitting device as claimed in claim 1 further comprising, within said island region, a reverse-tapered block projecting in a direction normal to said substrate and at a top portion thereof, includes an overhang projecting in a direction parallel to said substrate.

16. A display apparatus comprising;
    a first substrate and a second substrate facing each other with a vacuum space therebetween;
    a plurality of electron-emitting devices provided on said first substrate;
    a collector electrode provided on an interior surface of said second substrate; and
    a phosphor layer formed on said collector electrode;
    wherein each of said electron-emitting devices comprises
        an electron source layer made of one of a metal, a metal alloy and a semiconductor formed on an ohmic electrode,
        an insulating layer formed on said electron source layer and having at least one island region serving as an electron-emitting section in which film thickness of said insulating layer is reduced,
        a metal thin film electrode formed on said insulating layer, and
        a carbon region made of one of carbon and a carbon compound is provided on at least one of a bottom and inside of said island region, the carbon region being disposed having a vacuum space directly over the carbon region,
    wherein the electron source layer directly interfaces the carbon region at a center of the island region with the electron source layer facing the vacuum space via the carbon region at the center of the island region.

17. A display apparatus as claimed in claim 16 wherein said insulating layer, said metal thin film electrode and said carbon region are deposited by one of a physical deposition method and a chemical deposition method.

18. A display apparatus as claimed in claim 16 wherein said carbon region is a thin film deposited on one of said island region and said metal thin film electrode.

19. A display apparatus as claimed in claim 16 wherein said carbon region is a thin film deposited on said island region while a voltage is being applied between said electron source layer and said metal thin film electrode.

20. A display apparatus as claimed in claim 16 wherein said applied voltage is supplied intermittently according to a voltage application period in which the voltage rises and falls.

21. A display apparatus as claimed in claim 16 wherein said carbon region is a thin film deposited under said metal thin film electrode.

22. A display apparatus as claimed in claim 16 wherein said carbon region is a thin film deposited under said insulating layer.

23. A display apparatus as claimed in claim 16 wherein the thickness of said metal thin film electrode is gradually reduced in conjunction with said insulating layer.

24. A display apparatus as claimed in claim 16 wherein the thickness of said carbon region is gradually reduced in conjunction with said insulating layer.

25. A display apparatus as claimed in claim 16 wherein said insulating layer is made of a dielectric material and has a film thickness of at least 50 nm in areas other than said island region.

26. A display apparatus as claimed in claim 16 wherein said metal thin film electrode terminates on said insulating layer in a manner such that a thickness thereof is gradually reduced within said island region.

27. A display apparatus as claimed in claim 16 wherein said insulating layer terminates on said electron source layer within said island region.

28. A display apparatus as claimed in claim 16 wherein said island region is a recess on a flat surface of said metal thin film electrode and said insulating layer.

29. A display apparatus as claimed in claim 16 further comprising a fine particle within said island region.

30. A display apparatus as claimed in claim 16 further comprising, within said island region, a reverse-tapered block which projects outwardly in a direction normal to said substrate and has an overhang in a top portion thereof, projecting in a direction parallel to said substrate.

31. A display apparatus as claimed in claim 16 wherein bus lines are formed over a plurality of said metal thin film electrodes, and said ohmic electrodes and said bus lines are electrodes, each having a shape of a strip, and arranged orthogonal to each other.

32. An electron-emitting device as claimed in claim 1, wherein said island region defines a curved concave recess, the entire concave recess being semi-spherical in shape.

33. An electron-emitting device as claimed in claim 1, wherein film thickness of said insulating layer is gradually reduced and at least one of said carbon region and said metal thin film electrode has a film thickness that is gradually reduced to a thickness of zero in the island region.

34. A display as claimed in claim 16, wherein said island region defines a curved concave recess, the entire concave recess being semi-spherical in shape.

35. A display as claimed in claim 16, wherein film thickness of said insulating layer is gradually reduced and at least one of said carbon region and said metal thin film electrode has a film thickness that is gradually reduced to a thickness of zero in the island region.

* * * * *